(12) United States Patent
Nishida

(10) Patent No.: US 9,875,703 B2
(45) Date of Patent: Jan. 23, 2018

(54) LIQUID CRYSTAL APPARATUS AND ELECTRONIC EQUIPMENT

(71) Applicant: Seiko Epson Corporation, Tokyo (JP)

(72) Inventor: Masakazu Nishida, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/293,686

(22) Filed: Oct. 14, 2016

(65) Prior Publication Data

US 2017/0116936 A1 Apr. 27, 2017

(30) Foreign Application Priority Data

Oct. 21, 2015 (JP) ................................. 2015-206992

(51) Int. Cl.

| | | |
|---|---|---|
| G06F 1/00 | (2006.01) | |
| G09G 3/36 | (2006.01) | |
| G02F 1/1333 | (2006.01) | |
| G02F 1/1337 | (2006.01) | |
| G02F 1/1339 | (2006.01) | |
| G02F 1/1343 | (2006.01) | |
| G02F 1/1362 | (2006.01) | |
| G02F 1/1368 | (2006.01) | |

(52) U.S. Cl.
CPC ......... *G09G 3/3614* (2013.01); *G02F 1/1337* (2013.01); *G02F 1/1339* (2013.01); *G02F 1/133345* (2013.01); *G02F 1/134309* (2013.01); *G09G 3/3677* (2013.01); *G09G 3/3688* (2013.01); *G02F 1/1368* (2013.01); *G02F 1/13439* (2013.01); *G02F 1/136286* (2013.01); *G02F 2001/133357* (2013.01); *G02F 2001/133742* (2013.01); *G02F 2001/133749* (2013.01); *G02F 2201/121* (2013.01); *G02F 2201/123* (2013.01); *G09G 2300/0413* (2013.01); *G09G 2300/0426* (2013.01)

(58) Field of Classification Search
CPC ...... G09G 3/36; G09G 3/3614; G09G 3/3688; G09G 3/3677; G09G 2300/0413
See application file for complete search history.

(56) References Cited

U.S. PATENT DOCUMENTS

| | | | |
|---|---|---|---|
| 2013/0128210 A1 | 5/2013 | Nagasawa | |
| 2014/0368481 A1 | 12/2014 | Tomikawa | |
| 2015/0248866 A1* | 9/2015 | Tsunashima | ......... G09G 3/3607 345/694 |

FOREIGN PATENT DOCUMENTS

| | | |
|---|---|---|
| JP | 02-003086 A | 1/1990 |
| JP | 2007-279172 A | 10/2007 |
| JP | 2007-316119 A | 12/2007 |
| JP | 2012-042872 A | 3/2012 |
| JP | 2013-109192 A | 6/2013 |
| JP | 2013-257445 A | 12/2013 |
| JP | 2015-001634 A | 1/2015 |

* cited by examiner

*Primary Examiner* — Michael Faragalla
(74) *Attorney, Agent, or Firm* — ALG Intellectual Property, LLC

(57) ABSTRACT

A liquid crystal apparatus is provided with a first electrode to which a first signal is supplied, a second electrode provided between the first electrode and sealing material and to which a second signal is supplied, and a third electrode provided between the second electrode and the sealing material and to which a third signal is supplied, in which the reference potential of the third electrode is different from the reference potential of the first electrode and the second electrode.

20 Claims, 19 Drawing Sheets

LIQUID CRYSTAL APPARATUS AND ELECTRONIC EQUIPMENT

BACKGROUND

1. Technical Field

The present invention relates to a liquid crystal apparatus and electronic equipment.

2. Related Art

A liquid crystal apparatus is provided with a liquid crystal panel in which a liquid crystal layer is interposed between a pair of substrates. When light is incident to such a liquid crystal apparatus, the liquid crystal material, alignment film, or the like which forms the liquid crystal panel undergoes a photochemical reaction due to the incident light and ionic impurities may be generated as a reaction product. In addition, it is known that ionic impurities also diffuse into the liquid crystal layer from sealing material or a sealant in the manufacturing process of the liquid crystal panel. In particular, in a liquid crystal apparatus used in an optical modulating means (light valve) of a projection-type display apparatus (projector), since the luminous flux density of the incident light is high in comparison with a direct-view-type liquid crystal apparatus, it is necessary to suppress the ionic impurities from influencing the display.

As a means for suppressing the influence of the ionic impurities on the display, for example, JP-A-2015-1634 proposes a driving method for arranging three electrodes (ion trap electrodes) on the outer peripheral section of the display region and applying alternating current signals with different phases in a time equivalent to one period.

According to the driving method of JP-A-2015-1634, a transverse electric field is generated between the three electrodes and force for moving the ionic impurities is exerted from the display region toward the outer peripheral section of the display region in addition to the flow according to minute fluctuations in the liquid crystal. Therefore, since it is possible to efficiently accumulate ionic impurities in a region provided with the outermost peripheral electrode out of the three electrodes described above, it is possible to provide a liquid crystal apparatus with reduced display defects such as burn-in caused by ionic impurities.

However, in the liquid crystal apparatus described in JP-A-2015-1634, the liquid crystal apparatus is driven by turning on the power, and ionic impurities moving from the display region to the outer peripheral section of the display region are accumulated in the region in which the outermost peripheral electrode is provided; however, thereafter, there is a concern that the ionic impurities accumulated during the driving will be diffused in concentration and return to the display region when the power of the liquid crystal apparatus is turned off.

From the above, there is a problem in that the influence of the ionic impurities included in the liquid crystal layer on the display may not be sufficiently suppressed.

SUMMARY

The invention can be realized in the following aspects or application examples.

Application Example 1

A liquid crystal apparatus according to this application example includes a first substrate and a second substrate which are arranged opposite to each other and bonded with sealing material, a liquid crystal layer interposed between the first substrate and the second substrate, a pixel electrode provided in a display region of the first substrate, a counter electrode provided to oppose the pixel electrode in the first substrate or the second substrate, a first electrode provided in the first substrate or the second substrate between the display region and the sealing material in plan view and to which a first signal is supplied, a second electrode provided between the first electrode and the sealing material and to which a second signal is supplied, and a third electrode provided between the second electrode and the sealing material and to which a third signal is supplied, in which the first signal, the second signal, and the third signal are alternating current signals with the same frequency as each other, the first signal and the second signal transition between positive polarity and negative polarity with respect to a first reference potential, the third signal transitions between positive polarity and negative polarity with respect to a second reference potential, the second signal transitions from positive polarity to negative polarity in a period in which the first signal is a negative polarity, the third signal transitions from positive polarity to negative polarity in a period in which the second signal is a negative polarity, and the second reference potential is a potential which is different from the first reference potential.

According to this configuration, the first signal relates to a first reference potential and, in a time period which corresponds to one period of transitioning between positive polarity and negative polarity, an alternating current signal where the phase shifts in order of the first electrode, the second electrode, and the third electrode is supplied to the first electrode, the second electrode, and the third electrode. Therefore, over time, the direction of the electric field (electric force lines) which is generated between the electrodes moves from the first electrode close to the display region to the second electrode, and then moves from the second electrode toward the third electrode.

Accordingly, in a case where ionic impurities are included in the liquid crystal layer, the ionic impurities are firstly attracted to the first electrode and then attracted to the second electrode and the third electrode according to the movement of the electric field direction. In other words, it is possible to effectively attract ionic impurities to the outside of the display region.

In addition, since the second reference potential is different from the first reference potential, a residual direct current is generated by the potential difference between the first reference potential and the second reference potential. Therefore, the ionic impurities which are attracted to the outer peripheral section of the display region stay in the region provided with the third electrode due to the residual direct current.

As a result, even when the power of the liquid crystal apparatus is turned off, the diffusion of the concentration of the ionic impurities is prevented by the residual direct current and it is possible to suppress the ionic impurities from returning to the display region, thus it is possible to reduce the influence of burn-in caused by the ionic impurities included in the liquid crystal layer or the like on the display.

Application Example 2

In the liquid crystal apparatus according to the application example, the second reference potential is higher than the first reference potential.

According to this configuration, it is possible to attract negative ionic impurities in the liquid crystal layer to the outer peripheral section of the display region due to the electric field which is generated between the first electrode and the second electrode, and the third electrode.

As a result, it is possible to provide a liquid crystal apparatus in which display defects such as display unevenness or burn-in caused by negative ionic impurities being unevenly distributed locally are reduced and which has high reliability for maintaining a stable display state.

Application Example 3

In the liquid crystal apparatus according to the application example, the second reference potential is lower than the first reference potential.

According to this configuration, it is possible to attract positive ionic impurities in the liquid crystal layer to the outer peripheral section of the display region due to an electric field which is generated between the first electrode and the second electrode, and the third electrode.

As a result, it is possible to provide a liquid crystal apparatus in which display defects such as display unevenness or burn-in caused by positive ionic impurities being unevenly distributed locally are reduced and which has high reliability for maintaining a stable display state.

Application Example 4

In the liquid crystal apparatus according to the application example, a difference between the second reference potential and the first reference potential is smaller than a value of an amplitude of the first signal and the second signal.

According to this configuration, since the third signal is not biased to positive polarity or negative polarity with respect to the first signal and the second signal, it is possible to prevent defects such as electrical decomposition of the liquid crystal material due to the potential difference between the first electrode and the second electrode, and the third electrode.

Application Example 5

In the liquid crystal apparatus according to the application example, a difference between the second reference potential and the first reference potential is 0.3 V or more.

According to this configuration, it is possible to stably accumulate ionic impurities using the residual direct current which is generated in the region provided with the third electrode. Therefore, it is possible to suppress the ionic impurities from returning to the display region when the power of the liquid crystal apparatus is turned off.

Application Example 6

In the liquid crystal apparatus according to the application example, the third electrode has a different work function to the first electrode and the second electrode.

According to this configuration, the residual direct current which is generated in the region provided with the third electrode is increased in comparison with a case where the third electrode is formed of material with the same work function as the first electrode and the second electrode. Accordingly, it is possible to further suppress the ionic impurities from returning to the display region when the power of the liquid crystal apparatus is turned off.

Application Example 7

In the liquid crystal apparatus according to the application example, a density of an alignment film on the third electrode is less than a density of an alignment film on the first electrode and the second electrode.

According to this configuration, the ionic impurities tend to stay in the alignment film on the third electrode due to the residual direct current which is generated in the region provided with the third electrode. Accordingly, it is possible to suppress the ionic impurities from returning to the display region when the power of the liquid crystal apparatus is turned off.

Application Example 8

The liquid crystal apparatus according to the application example further includes an insulating film between the alignment film on the third electrode and the third electrode.

According to this configuration, the residual direct current which is generated in the region provided with the third electrode is increased in comparison with a case where there is no insulating film. Therefore, it is possible to gather more ionic impurities. Therefore, it is possible to suppress the ionic impurities from returning to the display region when the power of the liquid crystal apparatus is turned off.

Application Example 9

In the liquid crystal apparatus according to the application example, material which captures ionic impurities is coated on a surface of the alignment film on the third electrode.

According to this configuration, it is possible for ionic impurities to easily stay on the third electrode. Accordingly, it is possible to suppress the ionic impurities from returning to the display region when the power of the liquid crystal apparatus is turned off.

Application Example 10

In the liquid crystal apparatus according to the application example, the material which captures the ionic impurities is material which has a silanol group.

According to this configuration, the residual direct current is increased since the silanol group is present to a greater extent on the surface of the alignment film on the third electrode. Therefore, it is possible to suppress the ionic impurities from returning to the display region when the power of the liquid crystal apparatus is turned off.

Application Example 11

In the liquid crystal apparatus according to the application example, the first electrode, the second electrode, and the third electrode are provided surrounding the display region.

According to this configuration, it is possible to attract the ionic impurities from the display region to the outside regardless of the uneven distribution tendency of the ionic impurities in the display region.

Application Example 12

In the liquid crystal apparatus according to the application example, when a potential difference between the first signal and the second signal, and the third signal is the maximum, an off sequence which turns off power is performed.

According to this configuration, when the maximum residual direct current is generated in one period of the alternating current signal which is applied to the third electrode, the power of the liquid crystal apparatus is turned off by the off sequence. Therefore, it is possible to further suppress the ionic impurities from returning to the display region when the power of the liquid crystal apparatus is turned off.

Application Example 13

Electronic equipment according to this application example includes any one of the liquid crystal apparatuses described above.

According to this configuration, it is possible to provide electronic equipment provided with a liquid crystal apparatus having an excellent display quality in which display defects caused by ionic impurities are improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Description will be given below of embodiments embodying the invention with reference to the accompanying drawings. Here, in each of the following diagrams, each of the constituent elements is set to a size which is recognizable in the diagram and the scale of each of the constituent elements may be illustrated with a scale different from reality for convenience of description.

First Embodiment

In the present embodiment, description will be given of an active matrix-type liquid crystal apparatus provided with a thin film transistor (TFT) as a pixel switching element as an example. It is possible for this liquid crystal apparatus to be suitably used as, for example, an optical modulation means (liquid crystal light valve) of a projection-type display apparatus (liquid crystal projector) to be described below.

Configuration of Liquid Crystal Apparatus

Figure 1:
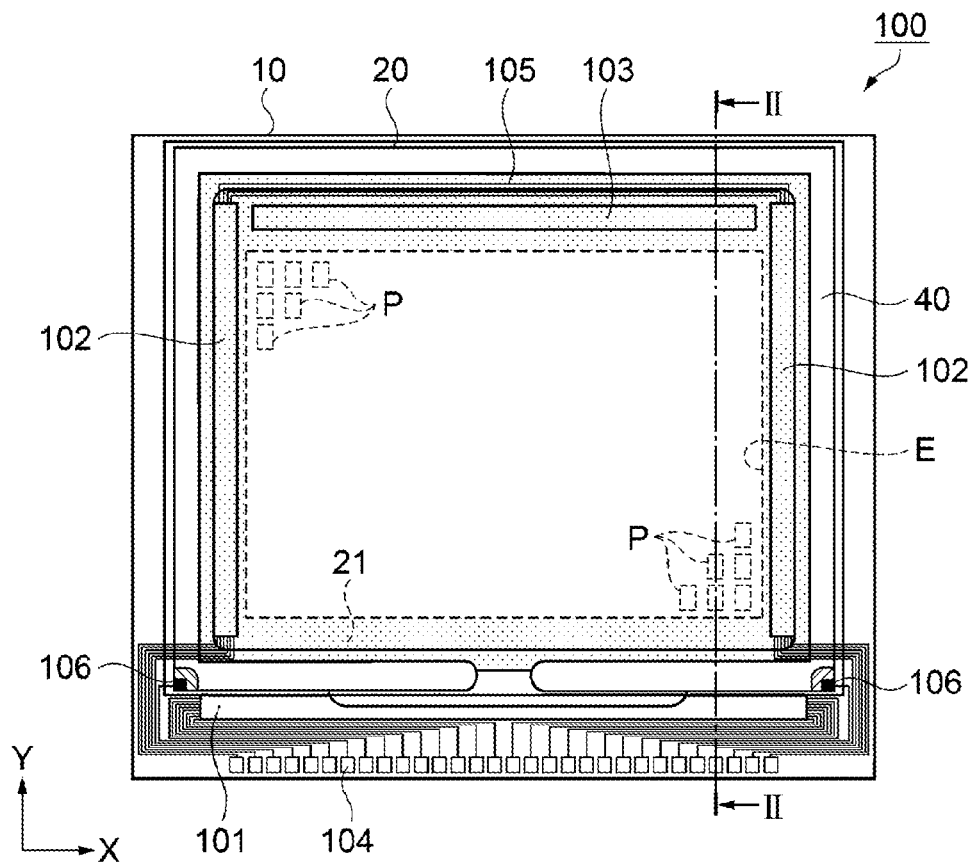
FIG. 1 is a schematic plan diagram which shows a configuration of a liquid crystal apparatus according to a first embodiment.
Figure 2:
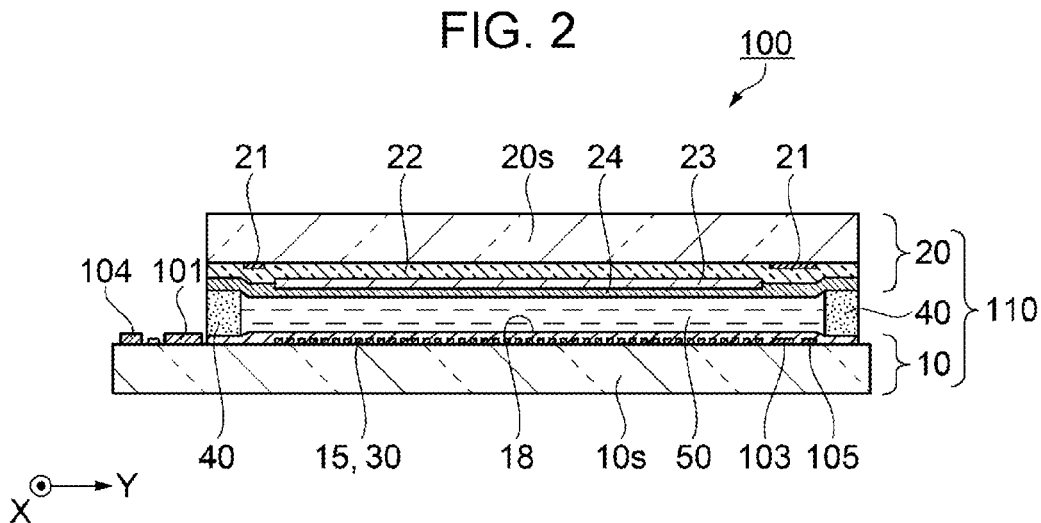
FIG. 2 is a schematic cross-sectional diagram taken along a line II-II of the liquid crystal apparatus which is shown in FIG. 1.

FIG. 1 is a schematic plan diagram which shows a configuration of a liquid crystal apparatus according to a first embodiment and FIG. 2 is a schematic cross-sectional diagram taken along a line II-II of the liquid crystal apparatus which is shown in FIG. 1. First, description will be given of the liquid crystal apparatus according to the present embodiment with reference to FIG. 1 and FIG. 2.

As shown in FIG. 1 and FIG. 2, a liquid crystal apparatus 100 according to the present embodiment has an element substrate 10 and a counter substrate 20 arranged to oppose each other, and a liquid crystal layer 50 interposed between the pair of substrates. For a base material 10s of the element substrate 10 and a base material 20s of the counter substrate 20, it is possible to use, for example, a quartz substrate or a glass substrate, which are transparent. The element substrate 10 corresponds to the first substrate of the invention and the counter substrate 20 corresponds to the second substrate of the invention.

The element substrate 10 is larger than the counter substrate 20, both substrates are bonded at an interval via sealing material 40 arranged along the outer edge of the counter substrate 20, and the liquid crystal layer 50 is formed by sealing liquid crystal having positive or negative dielectric anisotropy in the interval.

As the sealing material 40, for example, an adhesive such as a thermosetting or ultraviolet curable epoxy resin is adopted. Spacers (not shown) for maintaining the interval described above between the pair of substrates to be constant are incorporated into the sealing material 40.

A display region E which includes a plurality of pixels P arranged in a matrix is provided inside the sealing material 40. In addition, a parting section 21 surrounding the display region E is provided between the sealing material 40 and the display region E. The parting section 21 is composed of a light-shielding metal, an alloy or a metal oxide of such a metal, or the like. Here, dummy pixels may be provided in the display region E so as to surround the plurality of pixels P which contribute to the display.

The element substrate 10 is provided with terminal sections in which a plurality of external connection terminals 104 are arranged. A data line driving circuit 101 is provided between a first side section along the terminal section and the sealing material 40. In addition, a test circuit 103 is provided between the sealing material 40 along a second side section which opposes the first side section, and the display region E.

Furthermore, a scanning line driving circuit 102 is provided between the sealing material 40 along third and fourth side sections which are perpendicular to the first side section and which oppose each other, and the display region E. A plurality of wirings 105 connecting two of the scanning line driving circuits 102 are provided between the sealing material 40 on the second side section and the test circuit 103.

The wiring connecting these data line driving circuits 101 and scanning line driving circuits 102 is connected to a plurality of the external connection terminals 104 arranged along the first side section.

Below, description will be given in which the direction along the first side section is the X direction and the direction along the third side section is the Y direction. Here, the arrangement of the test circuit 103 is not limited thereto and the test circuit 103 may be provided at positions along the inside of the sealing material 40 between the data line driving circuits 101 and the display region E.

As shown in FIG. 2, transparent pixel electrodes 15 provided for each pixel P and a thin film transistor 30 (referred to below as the TFT 30), which is a switching element, signal wiring, and an alignment film 18 covering the above are formed on the liquid crystal layer 50 side surface of the element substrate 10.

The element substrate 10 includes the base material 10s, the pixel electrodes 15 formed on the base material 10s, the TFT 30, signal wiring (not shown), and the alignment film 18.

The counter substrate 20 which is arranged to oppose the element substrate 10 includes the base material 20s, the parting section 21 formed on the base material 20s, a planarizing layer 22 forming a film so as to cover the above, a common electrode 23 which covers the planarizing layer 22 and which is provided along at least the display region E, and an alignment film 24 which covers the common electrode 23. In the invention, the common electrode 23 corresponds to the counter electrode.

In addition, the liquid crystal apparatus 100 adopts a light-shielding structure which prevents the switching operation becoming unstable due to light being incident to the semiconductor layer in the TFT 30. Specifically, the parting section 21 surrounds the display region E and is provided at a position overlapping with the scanning line driving circuits 102 and the test circuit 103 in plan view.

Due to this, the parting section 21 fulfils a role of preventing these circuits from malfunctioning due to the light by shielding the light incident to these circuits from the side of the counter substrate 20. The parting section 21 ensures a high contrast in the display of the display region E by shielding unnecessary stray light from being incident to the display region E.

The planarizing layer 22 is composed of, for example, an inorganic material such as silicon oxide and is provided so as to cover the parting section 21 which has a light transmitting property. Examples of methods for forming the planarizing layer 22 include methods for forming films using a plasma chemical vapor deposition method or the like.

The common electrode 23 is, for example, composed of a transparent conductive film of indium tin oxide (ITO) or the like, covers the planarizing layer 22, and is electrically connected with a vertical conducting section 106 which is provided in the corner on the lower side of the counter substrate 20. The vertical conducting section 106 is electrically connected to wiring on the element substrate 10 side.

The alignment film 18 which covers the pixel electrodes 15 and the alignment film 24 which covers the common electrode 23 are selected based on the optical design of the liquid crystal apparatus 100. Examples of the alignment films 18 and 24 include organic alignment films on which a substantially horizontal alignment process is carried out with respect to liquid crystal molecules having positive dielectric anisotropy by forming films of organic material such as polyimide and rubbing the surfaces thereof, and inorganic alignment films substantially vertically aligned with respect to liquid crystal molecules having negative dielectric anisotropy by forming films of inorganic material such as SiOx (silicon oxide) using a vapor deposition method.

In the present embodiment, the alignment films 18 and 24 are composed of aggregates of columns in which an inorganic material such as silicon oxide is grown in a columnar shape from a predetermined direction, for example, by oblique evaporation. The liquid crystal molecules having negative dielectric anisotropy with respect to these alignment films 18 and 24 are substantially vertically aligned (vertical alignment: VA) with a pre-tilt angle of 3 degrees to 5 degrees in the inclination direction of the column with respect to the normal direction of the alignment film surface.

By applying an alternating current voltage (driving signal) between the pixel electrodes 15 and the common electrode 23 to drive the liquid crystal layer 50, the liquid crystal molecules behave (vibrate) so as to incline in the direction of the electric field generated between the pixel electrodes 15 and the common electrode 23.

The liquid crystal apparatus 100 is a transmission type and adopts an optical design which has a normally white mode in which the transmittance of the pixels P is the maximum in a state where no voltage is applied or a normally black mode in which the transmittance of the pixels P is the minimum in a state where no voltage is applied. Each polarizing element is used by being arranged according to the optical design on the light incident side and emission side of a liquid crystal panel 110 including the element substrate 10 and the counter substrate 20.

In the present embodiment, description will be given below of an example to which an optical design with a normally black mode is applied and liquid crystal having the inorganic alignment film and negative dielectric anisotropy described above is used as the alignment films 18 and 24.

Figure 3:
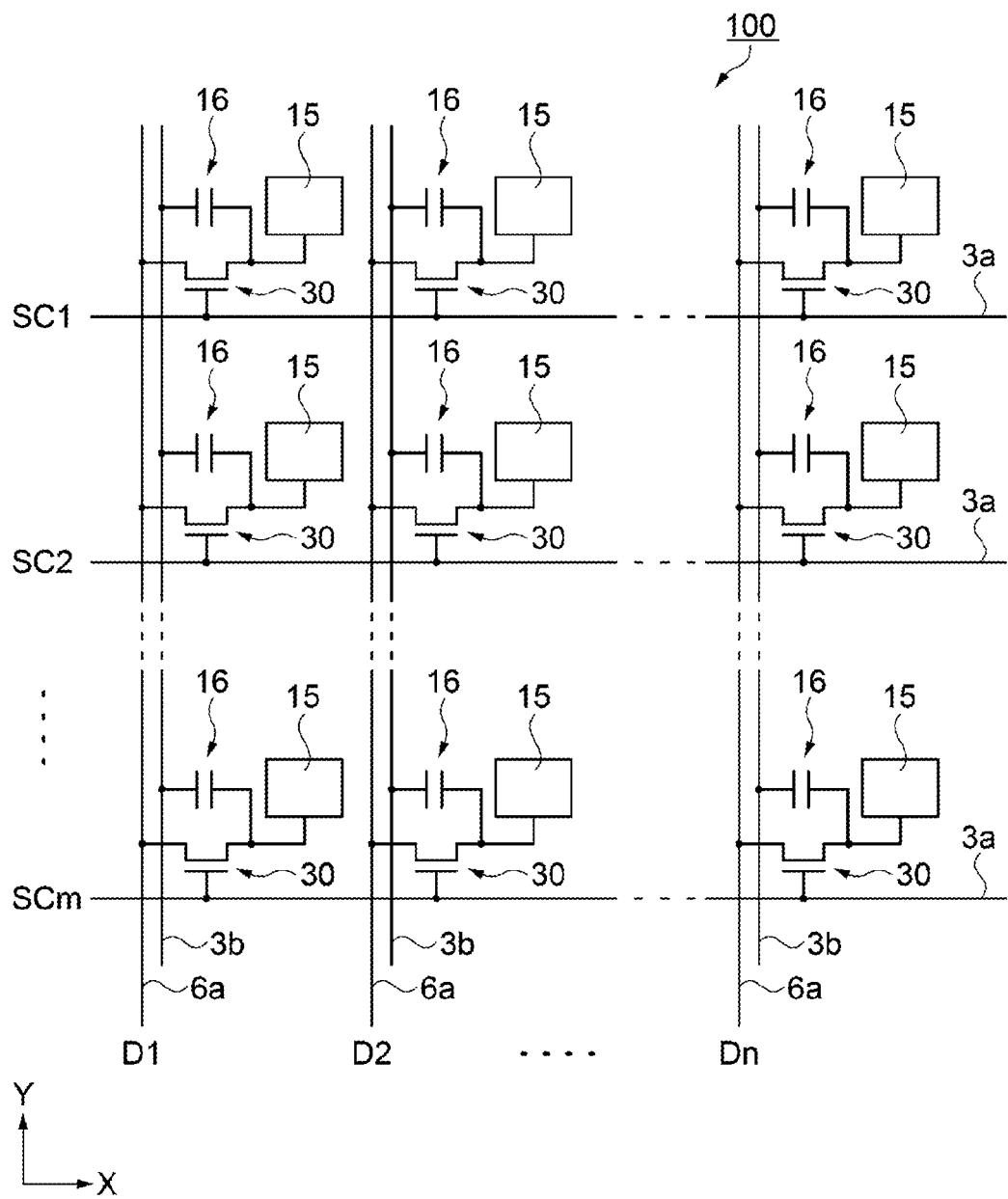
FIG. 3 is an equivalent circuit diagram which shows an electrical configuration of the liquid crystal apparatus.

FIG. 3 is an equivalent circuit diagram which shows the electrical configuration of the liquid crystal apparatus 100. Referring to FIG. 3, description will be given of the electrical configuration of the liquid crystal apparatus 100. The liquid crystal apparatus 100 has a plurality of scanning lines 3a and a plurality of data lines 6a as signal wirings perpendicular and insulated from each other in at least the display region E and capacitor lines 3b arranged in parallel along the data lines 6a. The direction in which the scanning lines 3a extend is the X direction and the direction in which the data lines 6a extend is the Y direction.

The pixel electrodes 15, the TFT 30, and a storage capacitor 16 are provided in regions which are partitioned according to the scanning lines 3a, the data lines 6a, the capacitor lines 3b, and the type of these signal lines, and the above form the pixel circuit of the pixel P.

The scanning lines 3a are electrically connected with gates of the TFT 30 and the data lines 6a are electrically connected with the sources of the TFT 30. The pixel electrodes 15 are electrically connected with drains of the TFT 30.

The data lines 6a are connected with a data line driving circuit 101 (refer to FIG. 1 and FIG. 2) and image signals D1, D2, . . . , Dn supplied from the data line driving circuit 101 are supplied to the pixels P. The scanning lines 3a are connected with a scanning line driving circuit 102 (refer to FIG. 1) and scanning signals SC1, SC2, . . . , SCm, supplied from the scanning line driving circuit 102 are supplied to the pixels P.

The image signals D1 to Dn supplied from the data line driving circuit 101 to the data lines 6a may be supplied line-sequentially in this order, or may be supplied to each group with respect to a plurality of the data lines 6a adjacent to each other. The scanning line driving circuit 102 supplies the scanning signals SC1 to SCm line-sequentially in pulses at a predetermined timing with respect to the scanning lines 3a.

The liquid crystal apparatus 100 has a configuration in which the TFT 30 which is a switching element is set to an on state by the input of the scanning signals SC1 to SCm only at certain period, such that the image signals D1 to Dn supplied from the data lines 6a are written to the pixel electrodes 15 at a predetermined timing.

Then, the image signals D1 to Dn of a predetermined level written to the liquid crystal layer 50 via the pixel electrodes 15 are held for a set period between the pixel electrodes 15 and a common electrode 23 arranged to oppose each other via the liquid crystal layer 50. The frequency of the image signals D1 to Dn is, for example, 60 Hz.

In order to prevent the held image signals D1 to Dn from leaking, the storage capacitors 16 are connected in parallel with a liquid crystal capacitor formed between the pixel electrodes 15 and the common electrode 23. The storage capacitors 16 are provided between the drain of the TFT 30 and the capacitor lines 3b.

Here, the data lines 6a are connected with the test circuit 103 shown in FIG. 1 and have a configuration in which it is possible to confirm operation defects or the like in the liquid crystal apparatus 100 in the manufacturing process of the liquid crystal apparatus 100 by detecting the image signals described above; however, illustration is omitted in the equivalent circuit in FIG. 3.

Peripheral circuits for driving and controlling the pixel circuit according to the present embodiment include the data line driving circuit 101, the scanning line driving circuit 102, and the test circuit 103. In addition, the peripheral circuit may include a sampling circuit which samples the image signals described above and supplies the results to the data lines 6a, and a pre-charge circuit which supplies a pre-charge signal with a predetermined voltage level to the data lines 6a in advance of the image signals described above.

Alignment State of Liquid Crystal Molecules

Figure 4:
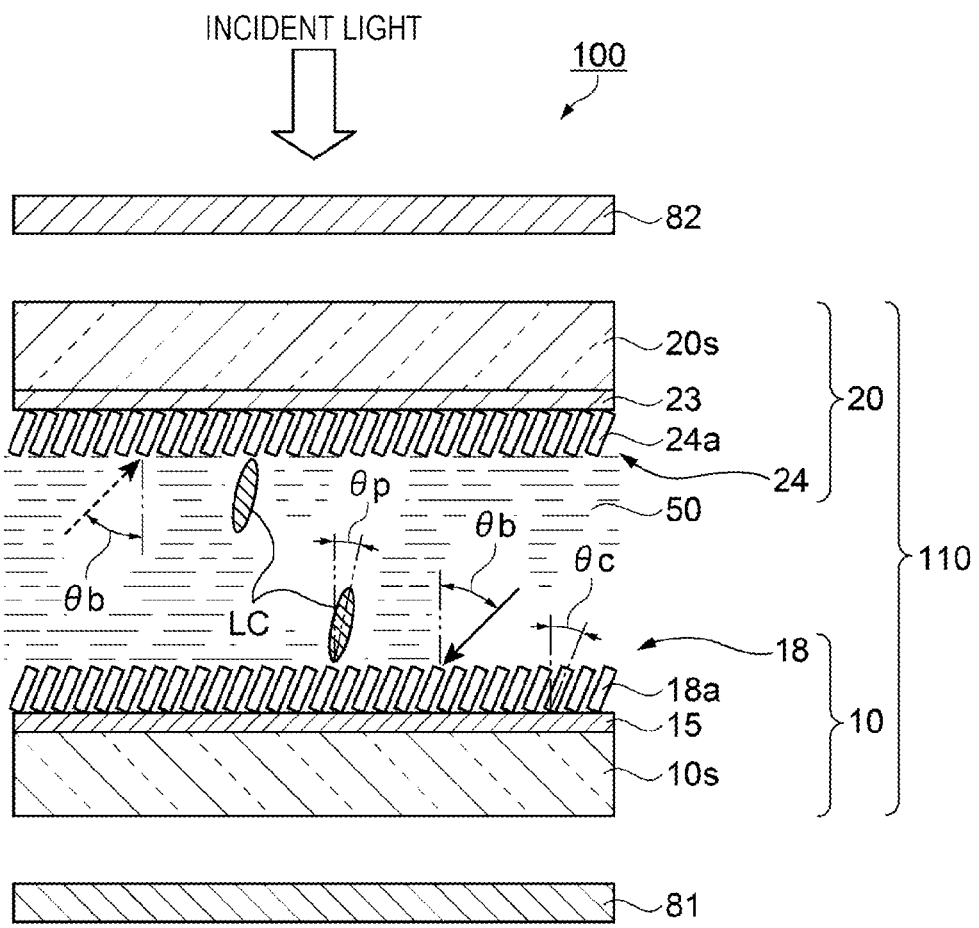
FIG. 4 is a schematic cross-sectional diagram which shows a forming state of an inorganic alignment film and an alignment state of liquid crystal molecules in the liquid crystal apparatus.
Figure 5:
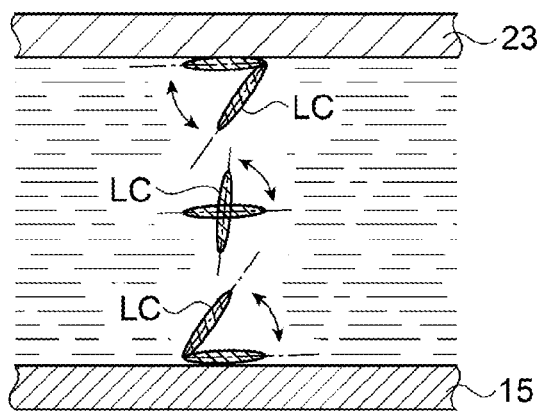
FIG. 5 is a schematic cross-sectional diagram which shows activity of the liquid crystal molecules.

Next, description will be given of the alignment state of the liquid crystal molecules in the liquid crystal apparatus 100 with reference to FIG. 4 and FIG. 5. FIG. 4 is a schematic cross-sectional diagram which shows the forming state of an inorganic alignment film and the alignment state of liquid crystal molecules in the liquid crystal apparatus 100 and FIG. 5 is a schematic cross-sectional diagram which shows the activity of the liquid crystal molecules.

As shown in FIG. 4, the alignment film 18 and the alignment film 24 obtained by oblique evaporation of silicon oxide using a vacuum deposition method, which is an example of a physical vapor deposition method, are formed on the surfaces of the pixel electrodes 15 and the common electrode 23 in the liquid crystal apparatus 100. Specifically, the deposition angle φb with respect to the normal line of the substrate surfaces of the element substrate 10 and the counter substrate 20 facing the liquid crystal layer 50 is approximately 45 degrees.

By this oblique deposition, the silicon oxide grows in a columnar shape in the deposition direction on the substrate surface. These structures are referred to as columns 18a and 24a. The alignment films 18 and 24 are aggregates of the columns 18a and 24a.

An angle φc of the growth direction of the columns 18a and 24a with respect to the normal line of the substrate surface does not necessarily coincide with the deposition angle φb and is approximately 20 degrees in this case. On the surfaces of the alignment films 18 and 24, a pre-tilt angle φp of vertically aligned liquid crystal molecules LC is approximately 3 degrees to 5 degrees.

In addition, the pre-tilt direction of the inclination of the liquid crystal molecules LC viewed from the normal direction of the substrate surface, that is, the inclination direction of the liquid crystal molecules LC, is the same as the planar deposition direction of the oblique deposition in the alignment films 18 and 24. The inclination direction described above of the vertical alignment process is set as appropriate based on the optical design conditions of the liquid crystal apparatus 100.

In this manner, an alignment state where the liquid crystal molecules LC having negative dielectric anisotropy with respect to the alignment film surfaces are given a pre-tilt angle φp and inverted is referred to as a substantially vertical alignment.

The panel including the element substrate 10 and the counter substrate 20 which are arranged to oppose each other and the liquid crystal layer 50 interposed between the pair of substrates is referred to as the liquid crystal panel 110. The liquid crystal apparatus 100 is provided with polarizing elements 81 and 82 respectively arranged on the light incident side and emission side of the liquid crystal panel 110.

In addition, the polarizing elements 81 and 82 are respectively arranged with respect to the liquid crystal panel 110 such that, in the polarizing elements 81 and 82, one of the transmission axis or absorption axis is parallel with respect to the X direction or the Y direction and the transmission axes or absorption axes are perpendicular to each other.

In the present embodiment, a substantially vertical alignment process is carried out such that the azimuth angle of the pre-tilt of the liquid crystal molecules LC intersects at 45 degrees with respect to the transmission axes or absorption axes of the polarizing elements 81 and 82 in the display region E. Accordingly, as shown in FIG. 5, when the liquid crystal layer 50 is driven by applying a driving voltage between the pixel electrodes 15 and the common electrode 23, the liquid crystal molecules LC fall in the inclination direction of the pre-tilt to make an optical arrangement which obtains a high transmittance.

When the driving (ON/OFF) of the liquid crystal layer 50 is repeated, the liquid crystal molecules LC repeat the activity of falling in the inclination direction of the pre-tilt and returning to the initial alignment state. In this manner, the substantially vertical alignment process in which the activity of the liquid crystal molecules LC occurs is referred to as a single-axis substantially vertical alignment process.

The incident direction of light with respect to the liquid crystal panel 110 is not limited to being incident from the counter substrate 20 side as shown in FIG. 4. In addition, the invention may have a configuration in which an optical compensation element such as a retardation plate is provided on the incident side or emission side of the light.

Display Unevenness Due to Ionic Impurities

Figure 6:
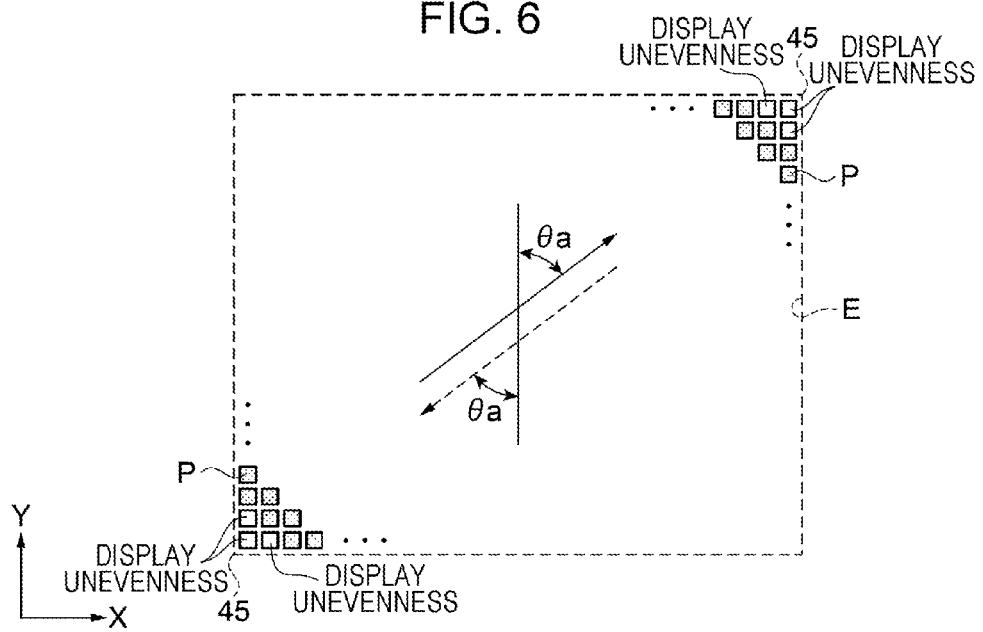
FIG. 6 is a schematic plan diagram which shows a relationship between the oblique deposition direction of the inorganic material and display unevenness caused by ionic impurities.

Next, with reference to FIG. 6, description will be given of display unevenness caused by ionic impurities which the invention aims to solve. FIG. 6 is a schematic plan diagram which shows a relationship between the oblique deposition direction of the inorganic material and the display unevenness caused by the ionic impurities.

The oblique deposition direction of the inorganic material which forms the columns 18*a* and 24*a* is, for example, a direction which intersects with the Y direction at a predetermined azimuth angle φa from the top right to the bottom left on the side of the element substrate 10 as shown by the arrow with the dashed line as shown in FIG. 6.

On the side of the counter substrate 20 which is arranged to oppose the element substrate 10, as shown by the arrow with the solid line, the oblique deposition direction is a direction which intersects with the Y direction at a predetermined azimuth angle φa from the bottom left to the top right. The predetermined azimuth angle φa is, for example, 45 degrees. Here, the oblique deposition direction shown in FIG. 6 is the direction when the liquid crystal panel 110 is seen from the counter substrate 20 side.

By driving the liquid crystal layer 50, the activity (vibration) of the liquid crystal molecules LC is generated and, in the vicinity of the interface between the liquid crystal layer 50 and the alignment films 18 and 24, the flow of the liquid crystal molecules LC is generated in the oblique deposition direction shown by the arrow with the dashed line or the solid line shown in FIG. 6. Assuming that ionic impurities with a positive or negative polarity are included in the liquid crystal layer 50, the ionic impurities move toward the corner sections 45 at the bottom left and the top right of the display region E along with the flow of the liquid crystal molecules LC.

When the insulation resistance of the liquid crystal layer 50 decreases in the pixels P positioned around the corner sections 45 due to the movement of the ionic impurities, this leads to a decrease in the driving potential and display unevenness or the burn-in phenomenon due to energization becomes remarkable in the pixels P. In particular, in a case where an inorganic alignment film is used as the alignment films 18 and 24, since the inorganic alignment film easily adsorbs ionic impurities, display unevenness or the burn-in phenomenon tend to stand out in comparison with organic alignment films.

For example, in the case of a normally black mode, the uneven distribution of the ionic impurities decreases the driving potential, causes light leakage, and decreases the contrast in the pixels P positioned around the corner sections 45 described above. FIG. 6 shows a state where light leakage is caused in three pixels P positioned around the corner sections 45 of the display region E.

The azimuth angle φa may be 45 degrees down and to the right as well as 45 degrees up and to the right as shown in FIG. 6. In such a case, display unevenness is generated around the corner sections 45 at the top left and the bottom right in the display region E. In other words, the azimuth angle φa of the liquid crystal molecules LC when the driving voltage is supplied to the liquid crystal layer 50 is the flow direction of the liquid crystal molecules LC.

Since the thickness of the liquid crystal layer 50 is approximately 1 μm to 3 μm depending on the optical design conditions of the liquid crystal panel 110, the flow of the liquid crystal molecules LC is strongly generated in the vicinity of the alignment film surfaces of each of the alignment films 18 and 24. Thus, the flow direction of the liquid crystal molecules LC is reversed between the element substrate 10 side and the counter substrate 20 side.

In the liquid crystal apparatus 100 according to the present embodiment, an ion trap mechanism for attracting ionic impurities from the display region E is provided between the sealing material 40 and the display region E in order to improve the display unevenness and the burn-in phenomenon. Below, description will be given of the ion trap mechanism according to the present embodiment with reference to FIG. 7 and FIG. 8.

Ion Trap Mechanism

Figure 7:
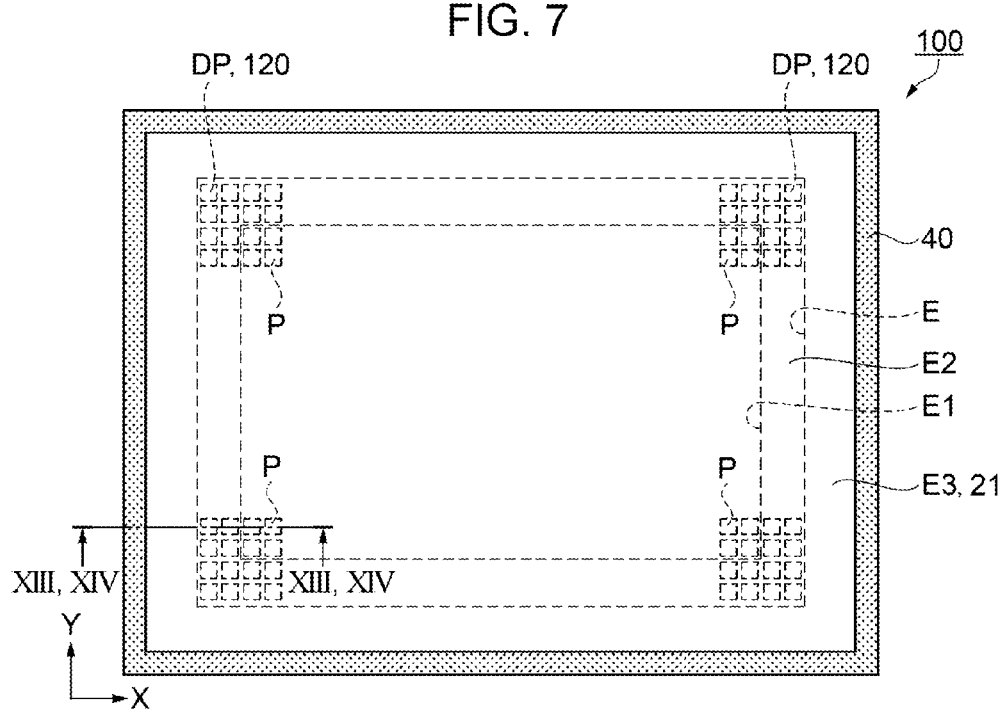
FIG. 7 is a schematic plan diagram which shows the arrangement of pixels contributing to the display and dummy pixels.
Figure 8:
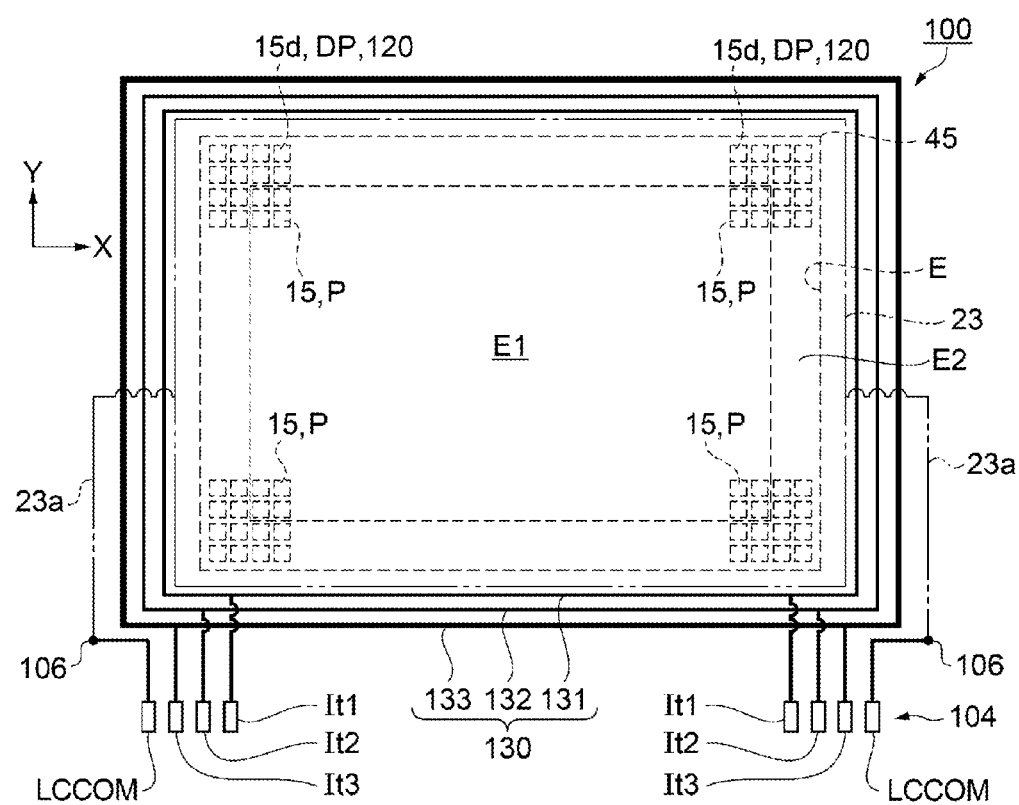
FIG. 8 is a wiring diagram of an electric parting section and an ion trap mechanism.

FIG. 7 is a schematic plan diagram which shows the arrangement of the pixels P contributing to the display and the dummy pixels DP and FIG. 8 is a wiring diagram of the electric parting section 120 and the ion trap mechanism.

As shown in FIG. 7, the display region E of the liquid crystal apparatus 100 according to the present embodiment includes an actual display region E1 in which a plurality of the pixels P which contribute to the display are arranged, and a dummy pixel region E2 having a plurality of dummy pixels DP provided to surround the actual display region E1.

The parting section 21 having the light-shielding property described above is provided between a region in which the sealing material 40 is arranged in a frame shape and the dummy pixel region E2, and the region in which the parting section 21 is provided is a parting region E3 which is independent of the ON or OFF of the liquid crystal apparatus 100.

In the dummy pixel region E2, dummy pixels DP are arranged two at a time in the X direction to interpose the actual display region E1 and dummy pixels DP are arranged two at a time in the Y direction to interpose the actual display region E1. Here, the number of dummy pixels DP arranged in the dummy pixel region E2 is not limited thereto, and the dummy pixels DP may be arranged at least one at a time to interpose the actual display region E1 in each of the X direction and the Y direction.

In addition, the dummy pixels DP may be arranged three or more at a time, or the numbers arranged in the X direction and the Y direction may be different. In the present embodiment, since the dummy pixels DP function as an electric parting section, the reference numeral 120 is applied to the plurality of dummy pixels DP and the dummy pixels DP may be referred to as the electric parting section 120.

As shown in FIG. 8, the ion trap mechanism according to the present embodiment is provided with an ion trap electrode 130 provided in a ring shape (a frame shape) so as to surround the display region E.

The ion trap electrode 130 has three electrodes of a first electrode 131, a second electrode 132, and a third electrode 133 which are electrically independent from each other, and which are gradually arranged away from the display region E in order of the first electrode 131, the second electrode 132, and the third electrode 133. In other words, the third electrode 133 is arranged to be the outermost electrode.

The ion trap mechanism attracts ionic impurities unevenly distributed around the corner sections 45 of the display region E to the outside of the display region E through the first electrode 131, the second electrode 132, and the third electrode 133 (simply referred to below together as ion trap electrodes 130).

The first electrode 131 is electrically connected with an external connection terminal 104 (It1) to which the first signal is supplied as an ion trap signal. The second electrode 132 is electrically connected with an external connection terminal 104 (It2) to which the second signal is supplied as an ion trap signal. The third electrode 133 is electrically connected with an external connection terminal 104 (It3) to which the third signal is supplied as an ion trap signal.

In addition, along the edge of the actual display region E1, a plurality of the dummy pixels DP arranged so as to surround the actual display region E1 have dummy pixel electrodes 15d.

Among the plurality of the external connection terminals 104, the external connection terminals 104 provided on both edge sides in the X axis direction are each electrically connected with the vertical conducting section 106. The common electrode 23 is electrically connected with the vertical conducting section 106 in the same manner via wiring 23a.

A common potential (may be referred to below as LCCOM) is supplied to the external connection terminals 104 (LCCOM). That is, the common potential (LCCOM) is applied to the common electrode 23.

In the present embodiment, in order to reduce variation in the potential which is supplied to the first electrode 131, the second electrode 132, and the third electrode 133 due to the positions of the first electrode 131, the second electrode 132, and the third electrode 133 on the element substrate 10, the present embodiment has a configuration in which the potential is supplied from each two of the external connection terminals 104 (It1, It2, It3); however, the invention is not limited thereto.

In other words, the external connection terminals 104 (It1, It2, It3) may be arranged one at a time, or may be arranged three or more at a time.

In the ion trap electrode 130, each of the first electrode 131, the second electrode 132, and the third electrode 133 is connected at one end to lead wiring and the other end may be in an opened (open) state.

Method for Driving Liquid Crystal Apparatus

Figure 9:
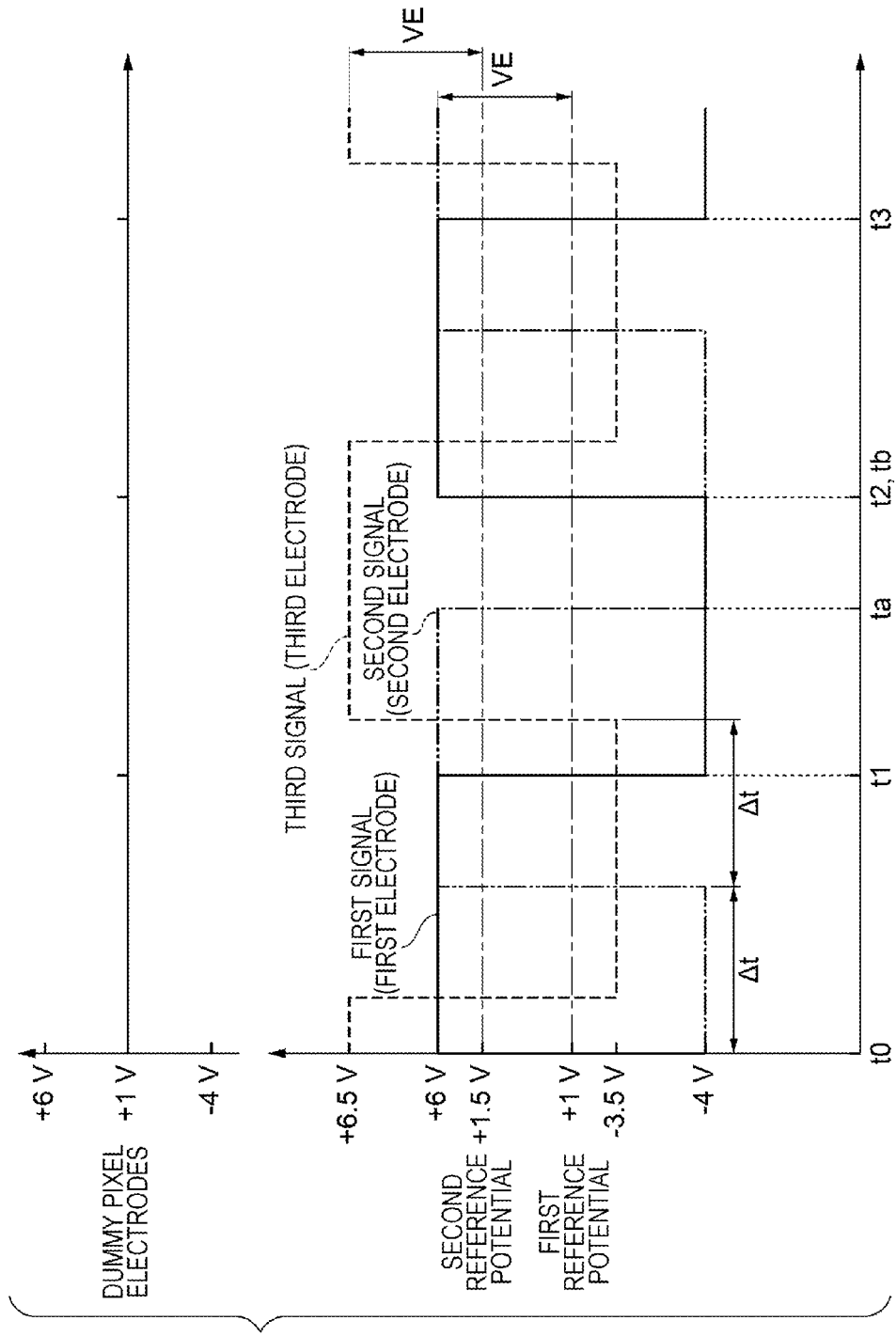
FIG. 9 is a timing chart which shows a waveform of a square wave alternating current signal which is applied to the first electrode, the second electrode, the third electrode, and the dummy pixel electrode of the ion trap mechanism.
Figure 10:
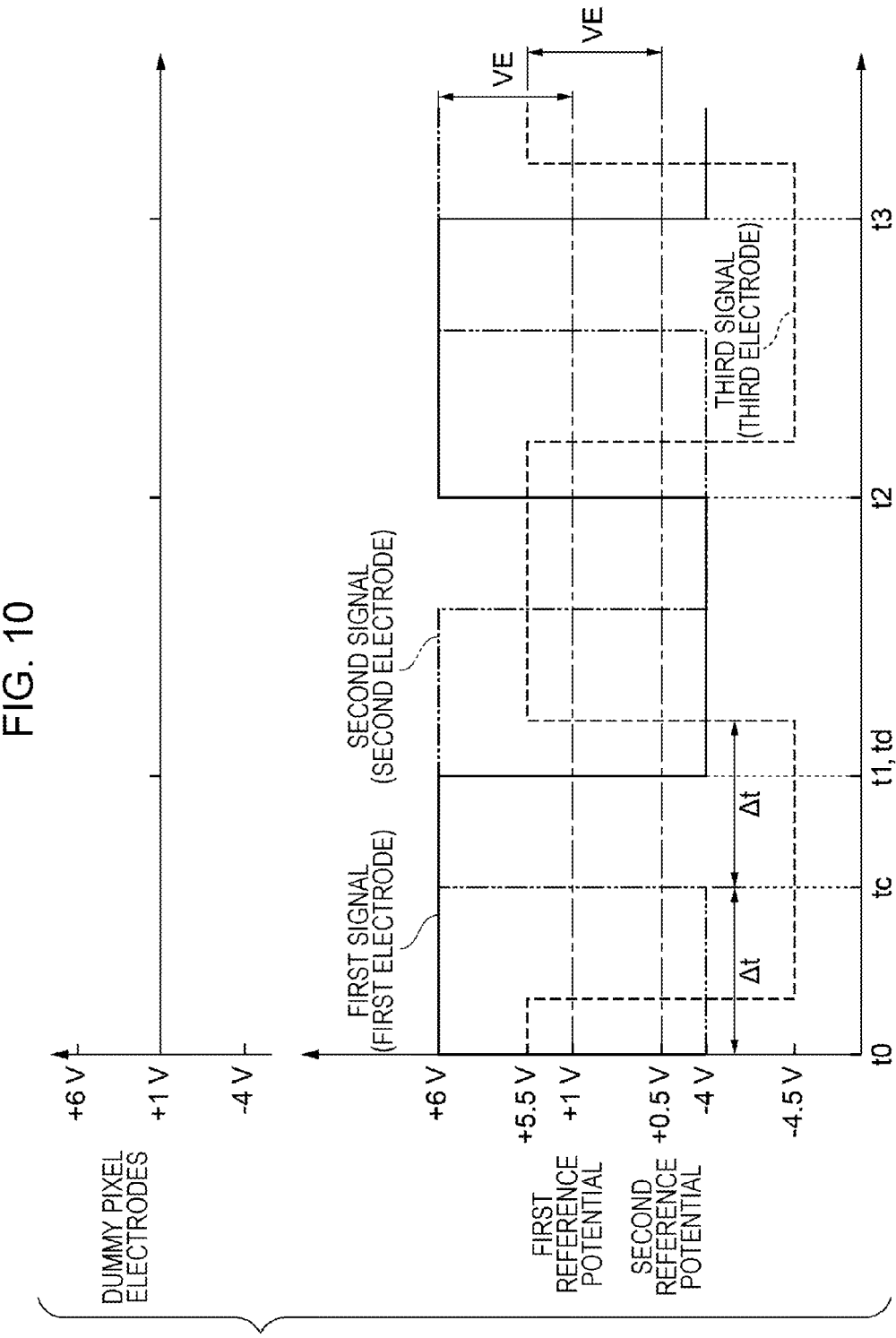
FIG. 10 is a timing chart which shows a waveform of a square wave alternating current signal which is applied to the first electrode, the second electrode, the third electrode, and the dummy pixel electrode of the ion trap mechanism.

FIG. 9 and FIG. 10 are timing charts which show waveforms and signals which are applied to the first electrode, the second electrode, the third electrode, and the dummy pixel electrodes of the ion trap mechanism. In more detail, FIG. 9 shows a case where the reference potential of the third electrode as the second reference potential is higher than the reference potential of the first electrode and the second electrode as the first reference potential. FIG. 10 shows a case where the second reference potential is lower than the first reference potential. In both of the timing charts, the horizontal axis represents time (timing) and the vertical axis represents potential.

Description will be given of the driving method of the liquid crystal apparatus 100 with reference to FIG. 9 and FIG. 10 using the example of a specific alternating current signal applied to each of the first electrode 131, the second electrode 132, and the third electrode 133.

As shown in FIG. 9, the driving method of the liquid crystal apparatus 100 according to the present embodiment sets the common electrode 23 and the reference potential to, for example, +1 V, and applies the same potential (for example, +1 V) as the potential of the common electrode 23 to the dummy pixel electrodes 15d in a display period for driving the pixel electrodes 15. Then, the second reference potential which is applied to the third electrode 133 is higher than the first reference potential which is applied to the first electrode 131 and the second electrode 132.

Specifically, the first reference potential is +1 V and the second reference potential is +1.5 V. A square wave alternating current signal of the same frequency is applied to the first electrode 131 and the second electrode 132, which changes the potential between the positive polarity (+) and the negative polarity (−) with respect to the first reference potential (+1 V), and a square wave alternating current signal of the same frequency as the first electrode 131 is applied to the third electrode 133, which changes the potential between the positive polarity (+) and the negative polarity (−) with respect to the second reference potential (+1.5 V).

Specifically, +1 V is set as the first reference potential and an alternating current signal which transitions between a high potential (+6 V) and a low potential (−4 V) is applied to the first electrode 131 and the second electrode 132. +1.5 V is set as the second reference potential and an alternating current signal which transitions between a high potential (+6.5 V) and a low potential (−3.5 V) is applied to the third electrode 133.

In other words, the amplitude (VE) of the square wave which is the alternating current signal is the same for all of the first signal of the first electrode 131, the second signal of the second electrode 132, and the third signal of the third electrode 133.

In addition, as shown in FIG. 10, the second reference potential may be lower than the first reference potential. Specifically, the first reference potential is +1 V and the second reference potential is +0.5 V.

In other words, with 0 V set as the first reference potential, an alternating current signal which transitions between the high potential (6 V) and the low potential (−4 V) is applied to the first electrode 131 and the second electrode 132. With +0.5 V set as the second reference potential, an alternating current signal which transitions between the high potential (+5.5 V) and the low potential (−4.5 V) is applied to the third electrode 133.

Here, the setting of the first reference potential, the second reference potential, the high potential, and the low potential of a square wave, which are applied to the first electrode 131, the second electrode 132, and the third electrode 133, and the setting of the potential which is applied to the dummy pixel electrodes 15d are not limited thereto.

Next, for more specific description of the driving method of the liquid crystal apparatus 100, alternating current signals with the same frequency are applied to each of the first electrode 131, the second electrode 132, and the third electrode 133 such that the first signal and the second signal transition between the positive polarity and the negative polarity with respect to the first reference potential, the third signal transitions between the positive polarity and the negative polarity with respect to the second reference potential, the second signal transitions from the positive polarity to the negative polarity in a period in which the first signal is a negative polarity, and the third signal transitions from the positive polarity to the negative polarity in a period in which the second signal is a negative polarity.

At this time, a square wave is applied to the second electrode 132 in a state where the phase is Δt shifted from the first signal and a square wave is applied to the third electrode 133 in a state where the phase is Δt shifted from the second signal. The phase difference Δt of the square wave is a value dividing one period of the alternating current signal by the number n of electrodes. Since the number of the electrodes in the present embodiment is 3, Δt is a ⅓ of a period.

Within a period corresponding to one period in the alternating current signal from a time $t_0$ to a time $t_2$, electric field distribution between the electrodes of the first electrode 131, the second electrode 132, and the third electrode 133 scrolls (moves) from the first electrode 131 to the third electrode 133 as time passes. The method for generating a horizontal electric field using such an alternating current signal is referred to as "electric field scrolling".

Frequency of Alternating Current Signal

To reliably attract the ionic impurities from the display region E to the ion trap electrode 130 arranged on the outside of the display region E, it is preferable to slowly scroll the electric field generated between the adjacent ion trap electrodes 130. That is, the frequency f (Hz) of the alternating current signal applied to the ion trap electrodes 130 is preferably smaller than the frequency of the driving signal for driving the pixel P.

The inventors learned that a preferable frequency f (Hz) of the alternating current signal in the ion trap electrodes 130 according to the present embodiment is derived as follows.

The movement speed v (m/s (seconds)) of the ionic impurities in the liquid crystal layer 50 is given by the product of the electric field strength e (V/m) between the adjacent ion trap electrodes 130 and the mobility μ (m²/V·s (seconds)) of the ionic impurities as shown in Equation (1).

$$\text{That is, } v = e \times \mu \tag{1}$$

The electric field strength e (V/m) is a value obtained by dividing the potential difference Vn between the adjacent ion trap electrodes 130 by the arrangement pitch p(m) of the ion trap electrodes 130 as shown in Equation (2).

$$\text{That is, } e = Vn/p \tag{2}$$

Since the potential difference Vn between the adjacent ion trap electrodes 130 corresponds to twice the effective voltage VE in the alternating current signal, the potential difference Vn can be derived from the following Equation (3).

$$\text{That is, } e = 2VE/p \tag{3}$$

Here, as shown in FIG. 9, the effective voltage VE in the square wave alternating current signal corresponds to the potential (amplitude) with respect to the square wave reference potential and is 5 V in the present embodiment.

By fitting Equation (3) into Equation (1), the movement speed v(m/s) of the ionic impurities is as in Equation (4).

$$\text{That is, } v = 2\mu VE/p \tag{4}$$

A time td for the ionic impurities to move between the adjacent ion trap electrodes 130 is a value obtained by dividing the arrangement pitch p of the ion trap electrodes 130 by the movement speed v of the ionic impurities as shown in Equation (5).

$$\text{That is, } td = p/v = p^2/2\mu VE \tag{5}$$

Accordingly, the preferable frequency f (Hz) is determined by scrolling the electric field in accordance with the time td for the ionic impurities to move between the adjacent ion trap electrodes 130.

Since the scrolling time of the electric field corresponds to the phase difference Δt of the alternating current signal, when the phase difference Δt is 1/n period and n is set as the number of ion trap electrodes 130, the preferable frequency f (Hz) of the alternating current signal applied to the ion trap electrodes 130 is derived from the following Equation (6).

$$\text{That is, } f = 1/n/td = 2\mu VE/np^2 \tag{6}$$

As shown in FIG. 9, when the phase difference Δt of the alternating current signal applied to the adjacent ion trap electrodes 130 is set to, for example, ⅓ of a period, the potential difference Vn between the adjacent ion trap electrodes 130 of the present embodiment is 10 V in a case of a square wave alternating current signal which transitions from +6 V to −4 V with +1 V set as the reference potential (the first reference potential) as in the first signal and the second signal and a square wave alternating current signal which transitions from +6.5 V to −3.5 V with +1.5 V set as the reference potential (the second reference potential) as in the third signal.

When the width of the first electrode 131 and the width of the second electrode 132 are, for example, 4 μm, the arrangement pitch p of the ion trap electrodes 130 is, for example, 8 μm, and the mobility μ of the ionic impurities is $2.2 \times 10^{-10}$ (m²/V·s), the preferable frequency f is approximately 12 Hz according to Equation (6). Here, when the arrangement pitch p is less than 8 μm, the frequency f is greater than 12 Hz.

The value of the mobility μ of the ionic impurities is described in, for example, "A Comparative Study on the Attributes of Ions in Nematic and Isotropic Phases", by A. Sawada, A. Manabe and S. Naemura, Jpn.J.Appl Phys Vol. 40, p. 220 to p. 224 (2001), and the like.

In addition, in a case where the scrolling speed of the electric field is greater than the movement speed of the ionic impurities, for example, in a case where the frequency f of the alternating current signal is greater than 12 Hz, since there is a concern that the ionic impurities will not follow the scrolling of the electric field and the effect of attracting the ionic impurities will be decreased, the frequency f is preferably 12 Hz or less.

On the other hand, when the frequency f is excessively small, there is a state where the same potential (gradient) as the direct current is applied between the ion trap electrodes 130 for a long time and there is a concern that defects will occur such as, for example, decomposition of the liquid crystal, burn-in, or display stains, which is not preferable.

In this manner, in order to reliably attract the ionic impurities to the third electrode 133 in accordance with the scrolling of the electric field, it is necessary to determine the frequency of the alternating current signal in consideration of the movement speed of the ionic impurities.

In addition, to draw out ionic impurities further from the display region E, the number n of the ion trap electrodes 130 is preferably increased from three to four or more. In a case where there are four or more of the ion trap electrodes 130, in the direction from the outer edge of the display region E toward the outside of the display region E, the width of the ion trap electrodes arranged to be outermost when seen from the display region E is preferably greater than the width of the other ion trap electrodes.

In addition, in the manufacturing process of the liquid crystal apparatus 100, there is a concern that positive polarity and negative polarity ionic impurities will be included in the liquid crystal layer 50, and it is known that positive polarity ionic impurities decrease the display quality more than negative polarity ionic impurities.

Therefore, in the square wave alternating current signal in FIG. 9 and FIG. 10, the time from $t_0$ up to $t_1$ during which the first signal is a positive polarity and the time from $t_1$ up to $t_2$ during which the first signal is a negative polarity are the same; however, the invention is not limited thereto.

For example, it is possible to actively attract the positive polarity ionic impurities to each of the ion trap electrodes 130 by applying an alternating current signal where the time where the first signal is positive polarity is longer than the time where the first signal is a negative polarity to the ion trap electrodes 130.

In addition, the square wave alternating current signal applied to the ion trap electrodes 130 may, for example, be amplified between potentials with two values with 0 V set as a reference potential; however, the waveform may be set so as to transition between potentials with three or more different values.

In this manner, since the scrolling of the electric field generated between the ion trap electrodes 130 is smooth, it is possible to smoothly move the ionic impurities from the first electrode 131 through the second electrode 132 up to the third electrode 133.

In addition, the alternating current signal which is applied to each of the ion trap electrodes 130 is not limited to a square wave, and may be a sine wave or a triangular wave in which the phases are different from each other in one period of time. Here, a digital circuit which generates a square wave makes it possible to simplify the circuit configuration in comparison with an analog circuit which generates an analog signal such as a sine wave.

In addition, with alternating current signals of the same frequency, the size of the amplitude of the alternating current signals applied to the first electrode 131, the second electrode 132, and the third electrode 133, in other words, the maximum potential of the positive polarity and the maximum potential of the negative polarity with respect to the reference potential, need not necessarily be the same.

Specifically, the alternating current signal amplified between 6 V and −4 V with +1 V set as the reference potential (the first reference potential) may be supplied to the first electrode 131, the alternating current signal amplified between 8.5 V and −6.5 V with +1 V set as the reference potential (the first reference potential) may be supplied to the second electrode 132, and the alternating current signal amplified between the 11.5 V and −8.5 V with +1.5 V set as the second reference potential may be supplied to the third electrode 133.

In this manner, since the size of the amplitude of the alternating current signals applied to the three ion trap electrodes 130 is greater farther from the display region E, it is possible to effectively attract ionic impurities toward the third electrode 133.

LCCOM

Figure 11:
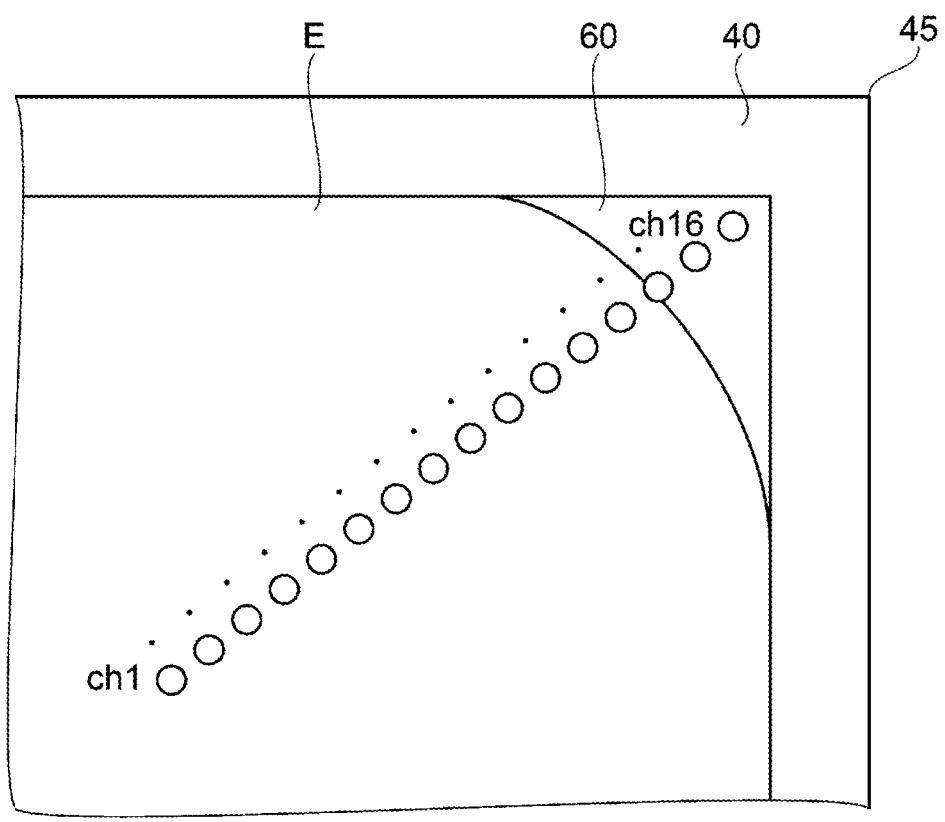
FIG. 11 is a schematic plan diagram which shows an ion accumulation region of the liquid crystal apparatus.
Figure 12:
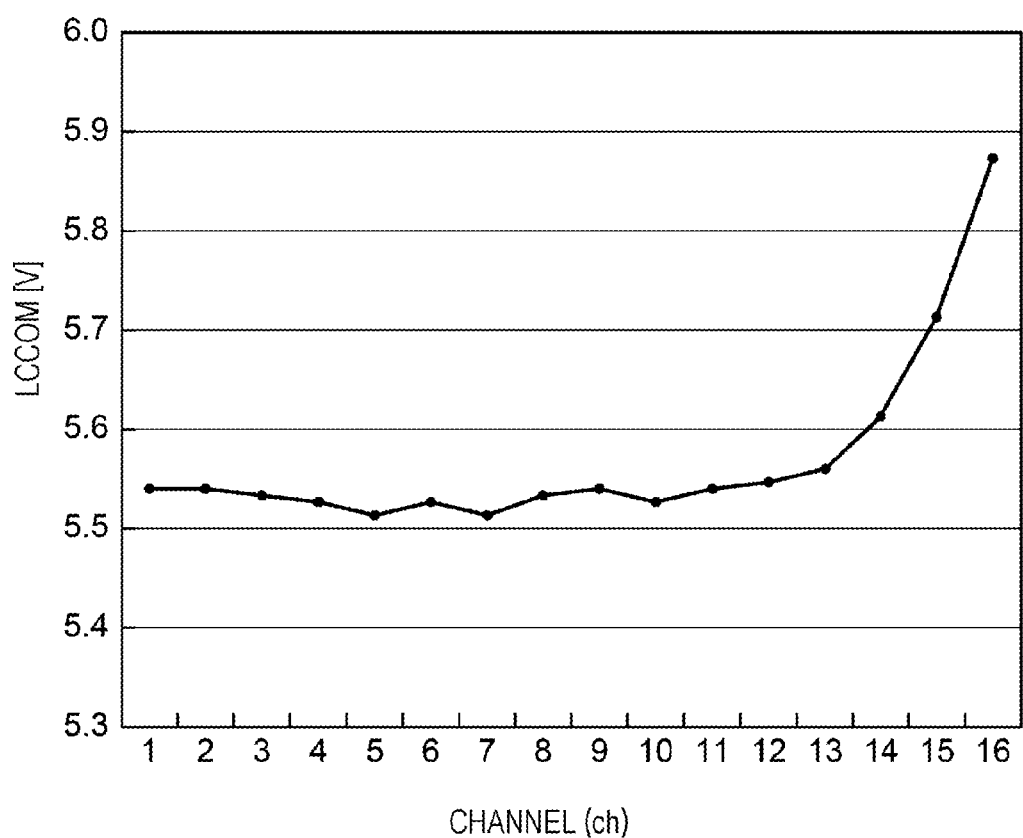
FIG. 12 is a graph which shows an LCCOM distribution.

FIG. 11 is a schematic plan diagram which shows an accumulation region of ionic impurities in the liquid crystal apparatus and FIG. 12 is a graph which shows the LCCOM distribution. As shown in FIG. 11, each LCCOM of each of the measurement points was measured by arranging sensors at measurement points at 16 locations from CH1 to CH16 in a direction from the display region E toward the corner sections 45 (outer peripheral sections) and carrying out flicker measurement. Here, in the present test, the value of the common potential (LCCOM) is set to +5.5 V.

As shown in FIG. 12, the LCCOM values of each measurement point were substantially constant at approximately 5.5 V to 5.6 V from CH1 to CH13; however, CH14 was 5.62 V, CH15 was 5.73 V, and CH16 was 5.89 V, which were approximately 0.3 V higher in comparison with the LCCOM values from CH1 to CH13.

In other words, the potential of the ion accumulation region 60 has a potential gradient (residual direct current) of 0.3 V in comparison with the potential of the display region E. Due to this potential gradient, it is considered that the ionic impurities of the display region E are segregated in the corner sections 45 of the display region E.

From the above, when a potential gradient of 0.3 V or more is applied to the ion trap electrodes 130, in other words, when the difference between the second reference potential and the first reference potential is set to 0.3 V or more, it is possible to generate a residual direct current sufficient to accumulate the ionic impurities at the third electrode 133.

In addition, the difference between the second reference potential and the first reference potential is preferably lower than the value of the amplitude (VE) of the first signal and the second signal. According to this, it is possible to prevent defects such as electrical decomposition of the liquid crystal material due to the potential difference generated between the first electrode 131 and the second electrode 132, and the third electrode 133.

Here, when the difference between the second reference potential and the first reference potential is set to the amplitude or more of the first signal and the second signal, an alternating current signal with a positive polarity or a negative polarity is applied to the third electrode 133 with respect to the first electrode 131 and the second electrode 132.

Ion Trap Electrodes

Figure 13:
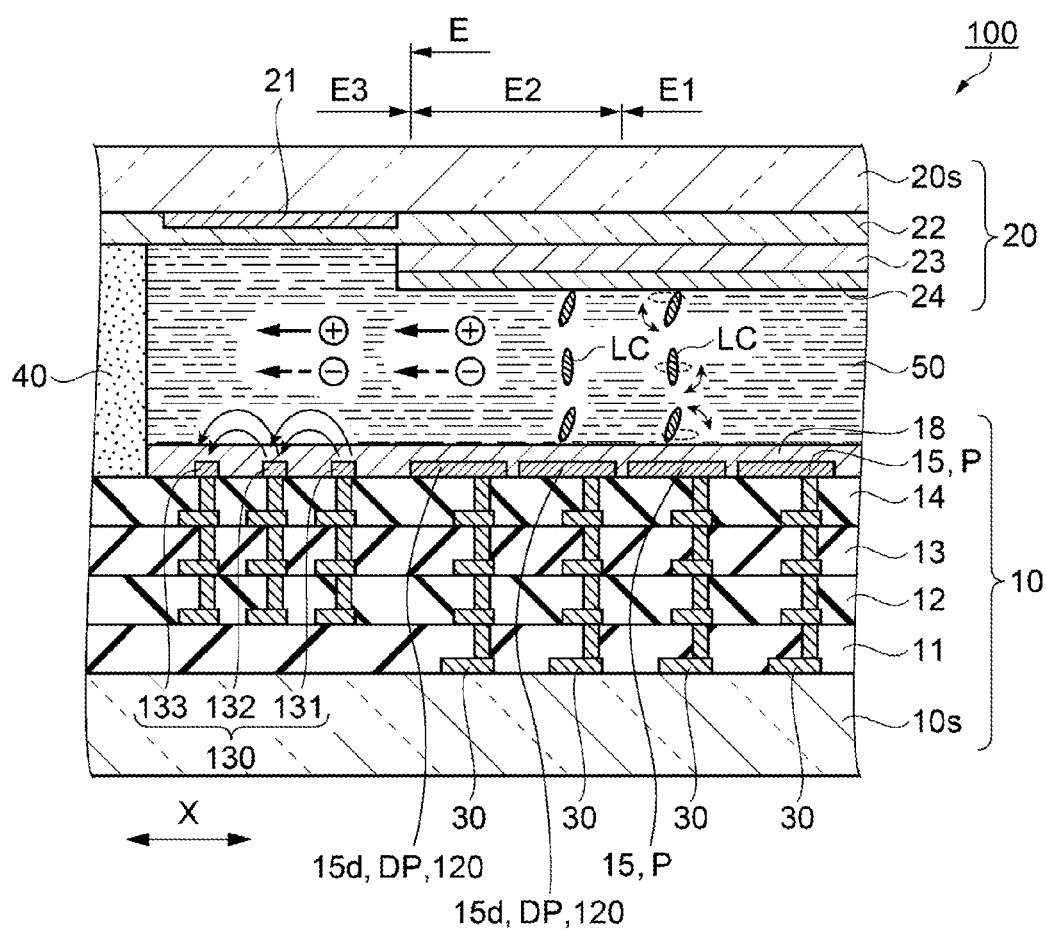
FIG. 13 is a cross-sectional diagram of main sections which shows the structure of the ion trap mechanism of the liquid crystal apparatus taken along line XIII-XIII in FIG. 7.
Figure 14:
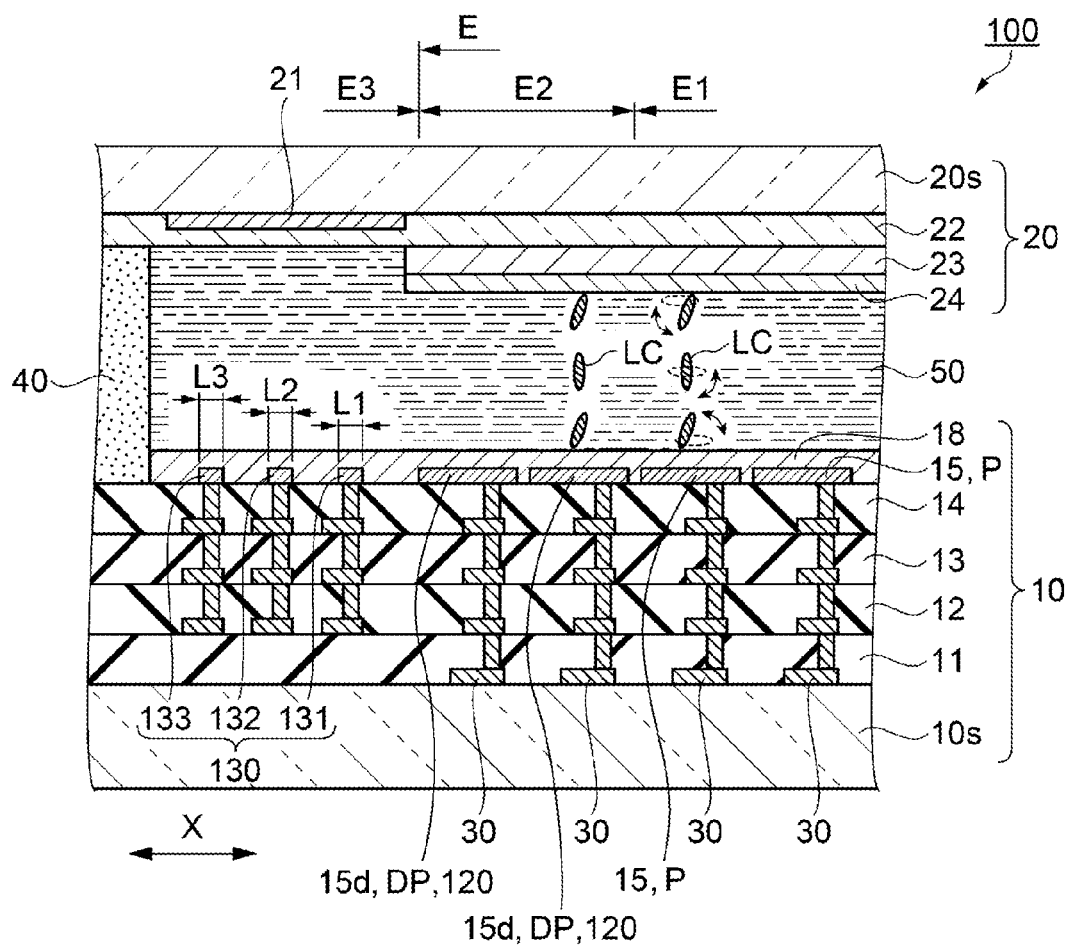
FIG. 14 is a cross-sectional diagram of main sections which shows the structure of the ion trap mechanism of the liquid crystal apparatus taken along line XIV-XIV in FIG. 7.

FIG. 13 and FIG. 14 are cross-sectional diagrams of main parts taken along the lines XIII-XIII and XIV-XIV in FIG. 7 which show the structure of the ion trap mechanism of the liquid crystal apparatus 100. In more detail, FIG. 13 is a cross-sectional diagram of main parts of the ion trap mechanism in the display period in which the pixel electrodes 15 are driven and FIG. 14 is a cross-sectional diagram of main parts of the ion trap mechanism in the non-display period in which the pixel electrodes 15 are not driven.

As shown in FIG. 13 and FIG. 14, the element substrate 10 of the liquid crystal apparatus 100 has a plurality of wiring layer 11 to wiring layer 14 on the base material 10s. Each of the pixel electrodes 15 of the pixels P, the dummy pixel electrodes 15d of the dummy pixel DP (electric parting section 120), and the first electrode 131, the second electrode 132, and the third electrode 133 (the ion trap electrodes 130) is formed on the wiring layer 14.

The common electrode 23 is provided on the counter substrate 20 so as to oppose the plurality of the pixel electrodes 15 and dummy pixel electrodes 15d in the display region E, in plan view, the outer edge of the common electrode 23 is positioned between the first electrode 131 and the outer edge of the display region E. In other words, the common electrode 23 is arranged so as to not overlap with the ion trap electrodes 130.

The dummy pixel electrode 15d and the ion trap electrode 130 are formed using the same transparent conductive film as the pixel electrode 15, for example, an ITO film, in the step of forming the pixel electrodes 15. The planar shape and size or arrangement pitch of the dummy pixel electrodes 15d are the same as the pixel electrodes 15.

The ion trap electrodes 130 are arranged at equal intervals in the X direction. Although not shown in FIG. 13 and FIG. 14, the ion trap electrodes 130 are also arranged at equal intervals in the Y direction, connected with wiring provided in the wiring layers 11 to 13 of the lower layer, and each guided to the external connection terminals 104 (refer to FIG. 8).

The dummy pixel electrodes 15*d* are electrically connected with the TFT 30 provided in wiring layer 11. In a case where the liquid crystal apparatus 100 is in a normally black mode, since the electric parting section 120 is constantly set to the "black mode (black display)" regardless of the display state of the pixels P of the actual display region E1, for example, an alternating current potential of a level where the transmission of the dummy pixels DP does not change is applied to the plurality of dummy pixel electrodes 15*d* via the TFT 30.

Here, there is a possibility that ionic impurities having a positive polarity (+) and ionic impurities having a negative polarity (−) are present. Accordingly, the positive polarity or negative polarity ionic impurities are attracted to the first electrode 131 according to the polarity of the first signal of the first electrode 131.

When the ionic impurities attracted to the first electrode 131 are allowed to remain as is, there is a concern that the ionic impurities will be gradually stored and influence the electric parting section 120 or the display of the actual display region E1, thus the ionic impurities attracted to the first electrode 131 are preferably successively moved to the second electrode 132 and the third electrode 133.

In the present embodiment, as described above, since alternating current signals with different phases are applied to the ion trap electrodes 130 during the driving (in the display period) of the liquid crystal apparatus 100, the horizontal electric field (electric force lines) generated between the adjacent ion trap electrodes 130 scrolls in the direction from the first electrode 131 toward the third electrode 133 close to the electric parting section 120 or the display region E.

Due to this, the positive polarity or the negative polarity ionic impurities attracted to the first electrode 131 can be moved to the third electrode 133.

In this manner, the method for driving the liquid crystal apparatus 100 for moving the ionic impurities from the first electrode 131 to the third electrode 133 with the passage of time using the scrolling of the electric field generated in the ion trap electrodes 130 is referred to below as "Ion Surf (IS) driving".

As shown in FIG. 13, for example, in a case where positive polarity (+) ionic impurities are included in the liquid crystal layer 50 in the display period for driving the pixel electrode 15, the positive polarity ionic impurities move to the display region E according to the flow of the liquid crystal molecules LC due to the IS driving. The rate of the flow is considered to depend on the frequency of the driving signal for driving the pixels P.

Then, the ionic impurities are attracted to the parting region E3 in which the ion trap electrodes 130 are provided and transported toward and accumulated at the third electrode 133 by the scrolling of the electric field moving from the first electrode 131 side to the third electrode 133 side with the passage of time.

The counter substrate 20 according to the present embodiment is not provided with the common electrode 23 at a portion opposing the ion trap electrodes 130 via the liquid crystal layer 50. Accordingly, the electric field is not easily generated between the ion trap electrodes 130 and the common electrode 23.

Therefore, the movement of the ionic impurities is not prevented by the electric field generated between the ion trap electrodes 130 and the common electrode 23 and the ionic impurities are attracted to the parting region E3.

As shown in FIG. 14, in the direction from the outer edge of the display region E toward the outside (the sealing material 40) of the display region E, the width L1 of the first electrode 131, the width L2 of the second electrode 132, and the width L3 of the third electrode 133 are substantially the same, for example, 4 μm each.

The arrangement pitch of the first electrode 131, the second electrode 132, and the third electrode 133 is, for example, 12 μm. In other words, the interval between the first electrode 131 and the second electrode 132 and the interval between the second electrode 132 and the third electrode 133 are both, for example, 8 μm.

In the X direction, the interval between the dummy pixel electrodes 15*d* (the electric parting section 120) and the adjacent first electrode 131 is greater than the interval between the first electrode 131 and the second electrode 132 (=the interval between the second electrode 132 and the third electrode 133), for example, 10 μm.

In the Y direction, the interval between the dummy pixel electrode 15*d* (the electric parting section 120) and the adjacent first electrode 131 is greater than the interval between the first electrode 131 and the second electrode 132, for example, 10 μm.

Through this configuration, it is possible to reduce the influence of the electric field generated between the first electrode 131 and the dummy pixel electrodes 15*d* (the electric parting section 120) involved in the attraction of the ionic impurities.

In addition, the liquid crystal apparatus 100 of the present embodiment generates a residual direct current due to the potential difference between the first reference potential and the second reference potential since the second reference potential is different from the first reference potential. The ionic impurities attracted to the outer peripheral section of the display region by this residual direct current when the power of the liquid crystal apparatus 100 is turned off stay in the region in which the third electrode 133 is provided. As a result, it is possible to prevent the concentration diffusion of the ionic impurities and to suppress the ionic impurities from returning to the display region E.

In addition, the liquid crystal apparatus 100 of the present embodiment has a logic controller in a peripheral circuit and, when the potential difference between the first signal and the second signal, and the third signal is the maximum in one period of the alternating current signal, the logic controller executes an off sequence which turns off the power of the liquid crystal apparatus 100. Due to this, when power is off, the maximum residual direct current is generated in the one period of the alternating current signal on the third electrode 133.

For example, as shown in FIG. 9, when the off sequence is executed during the time from a time ta to a time tb (=$t_2$), in other words, when the third signal is the maximum and the first signal and the second signal are the minimum, the residual direct current which can most efficiently gather the negative ionic impurities is generated.

In addition, for example, as shown in FIG. 10, when the off sequence is executed during the time from a time tc to a time td (=$t_1$), in other words, when the first signal and the second signal is the maximum and the third signal is the minimum, the residual direct current which can most efficiently gather the positive ionic impurities is generated.

Aluminum Electrode

Figure 15:
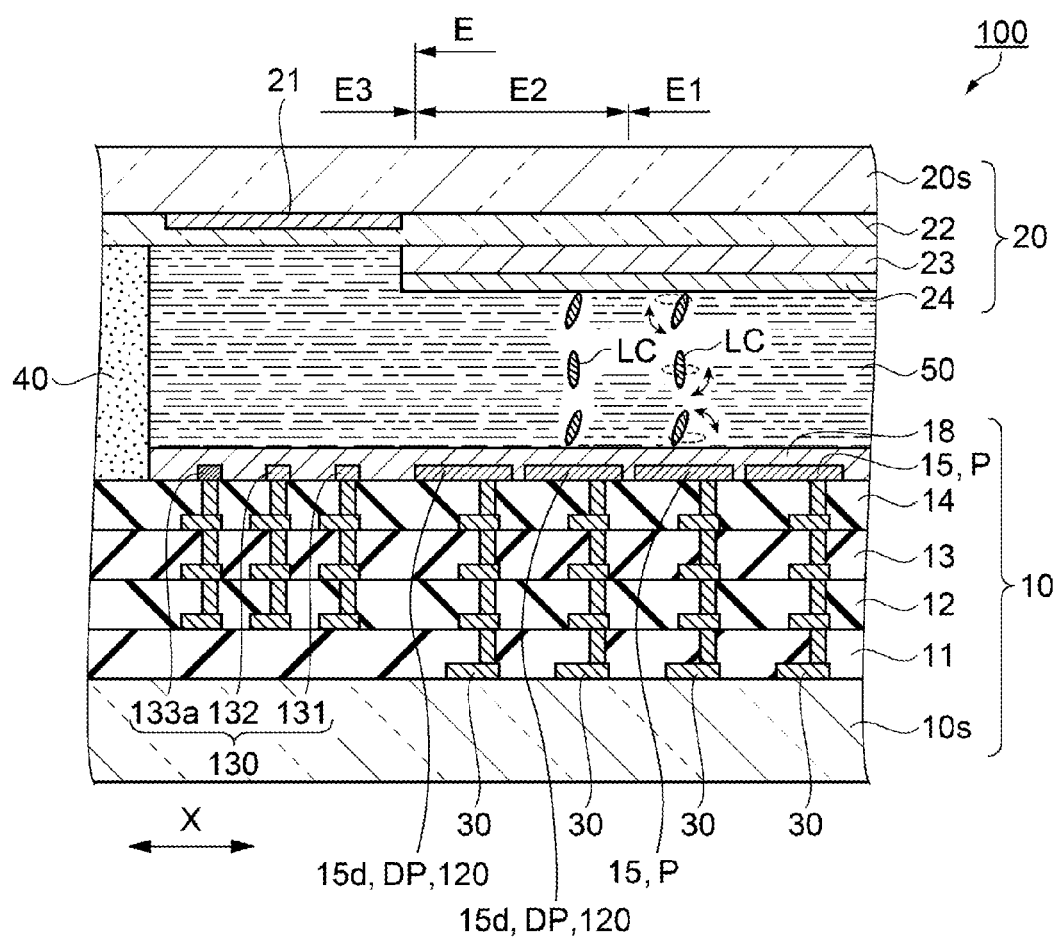
FIG. 15 is a schematic cross-sectional diagram which shows the configuration of the liquid crystal apparatus in which the third electrode is formed of aluminum.

FIG. 15 is a schematic cross-sectional diagram which shows the configuration of a liquid crystal apparatus in which the third electrode is formed of aluminum (Al). As shown in FIG. 15, the third electrode 133*a* may be formed by material, for example, aluminum (Al), with a different work function to the material (for example, ITO) which forms the first electrode 131 and the second electrode 132. The work function of ITO is approximately 4.6 eV and the work function of aluminum (Al) is 4.13 eV.

As long as the material is material with a different work function to ITO, it is possible to generate a large residual direct current in the region in which the third electrode 133a is provided.

Examples of materials having a work function different from ITO include Ti, Ni, Hf, and the like in addition to aluminum (Al). The work function of Ti is 4.14 eV, the work function of Ni is 4.19 eV, and the work function of Hf is 3.90 eV.

By using this configuration, the residual direct current generated in the third electrode 133 is increased in comparison with a case where the third electrode 133a is formed of material with the same work function as the first electrode 131 and the second electrode 132. Accordingly, it is possible to further suppress the ionic impurities from returning to the display region E when the power of the liquid crystal apparatus 100 is turned off.

In addition, in the element substrate 10, the alignment film 18 where the liquid crystal molecules LC having negative dielectric anisotropy are substantially vertically aligned is formed so as to cover at least the pixel electrodes 15 and the dummy pixel electrodes 15d.

On the other hand, in the case of the present embodiment, since the ionic impurities are moved by the IS driving, the ion trap electrodes 130 are preferably formed so as not to be covered by the alignment film 18 to which there is a concern that the ionic impurities will be adsorbed and prevented from moving.

The following effects are obtained by the liquid crystal apparatus 100 according to the first embodiment described above.

(1) Within a period corresponding to one period in which the first signal transitions from the first reference potential to positive polarity and negative polarity, an alternating current signal of which the phase shifts in order of the first electrode 131, the second electrode 132, and the third electrode 133 is supplied to the first electrode 131, the second electrode 132, and the third electrode 133. Therefore, the direction of the electric field (electric force lines) generated between these electrodes moves from the first electrode 131 close to the display region E to the second electrode 132 and then from the second electrode 132 toward the third electrode 133 with the passage of time.

Accordingly, in a case where the ionic impurities are included in the liquid crystal layer 50, the ionic impurities are first attracted to the first electrode 131, then attracted to the second electrode 132 and the third electrode 133 according to the movement of the electric field direction. In other words, it is possible to effectively attract the ionic impurities to the outside of the display region E.

In addition, since the second reference potential is different from the first reference potential, a residual direct current is generated by the potential difference between the first reference potential and the second reference potential. Therefore, it is possible for the ionic impurities attracted to the third electrode 133 to stay due to the residual direct current.

As a result, it is possible to suppress the ionic impurities from returning to the display region E when the power of the liquid crystal apparatus 100 is turned off, thus it is possible to reduce the influence of burn-in caused by the ionic impurities included in the liquid crystal layer 50 or the like on the display.

(2) In a case where the second reference potential is higher than the first reference potential, it is possible to attract the negative ionic impurities in the liquid crystal layer 50 to the outer peripheral section of the display region due to the electric field generated between the first electrode 131 and the second electrode 132, and the third electrode 133.

As a result, it is possible to provide the liquid crystal apparatus 100 in which display defects such as display unevenness or burn-in caused by negative ionic impurities being unevenly distributed locally are reduced and which has high reliability for maintaining a stable display state.

(3) In a case where the second reference potential is lower than the first reference potential, it is possible to attract positive ionic impurities in the liquid crystal layer 50 to the outer peripheral section of the display region due to the electric field generated between the third electrode 133, and the first electrode 131 and the second electrode 132.

As a result, it is possible to provide the liquid crystal apparatus 100 in which display defects such as display unevenness or burn-in caused by positive ionic impurities being unevenly distributed locally are reduced and which has high reliability for maintaining a stable display state.

(4) Since the difference between the second reference potential and the first reference potential is smaller than the value of the amplitude of the first signal and the second signal, the third signal is not biased to positive polarity or negative polarity with respect to the first signal and the second signal. Therefore, it is possible to prevent defects such as electrical decomposition of the liquid crystal material due to the potential difference between the first electrode 131 and the second electrode 132, and the third electrode 133.

(5) Since the difference between the second reference potential and the first reference potential is 0.3 V or more, it is possible to accumulate and gather the ionic impurities in the region where the third electrode 133 is provided due to the residual direct current generated in the region provided with the third electrode 133. Therefore, when the power of the liquid crystal apparatus 100 is turned off, it is possible to further suppress the ionic impurities from returning to the display region E.

(6) The third electrode 133a may be formed of material with a different work function to the first electrode 131 and the second electrode 132, for example, aluminum (Al). The residual direct current is increased in comparison with a case where the third electrode 133 is formed of material with the same work function as the first electrode 131 and the second electrode 132. Accordingly, it is possible to further suppress the ionic impurities from returning to the display region E when the power of the liquid crystal apparatus 100 is turned off.

(7) Since the first electrode 131, the second electrode 132, and the third electrode 133 are provided to surround the display region E, it is possible to attract the ionic impurities from the display region E to the outside regardless of the uneven distribution tendency of the ionic impurities in the display region E.

(8) Since an off sequence which turns off the power of the liquid crystal apparatus 100 is performed when the potential difference between the first signal and the second signal, and the third signal is the maximum, the power of the liquid crystal apparatus 100 is turned off when the maximum residual direct current is generated in one period of the alternating current signal on the third electrode 133. Therefore, it is possible to further suppress the ionic impurities from returning to the display region E when the power of the liquid crystal apparatus 100 is turned off.

Second Embodiment

Configuration of Liquid Crystal Apparatus

Figure 16:
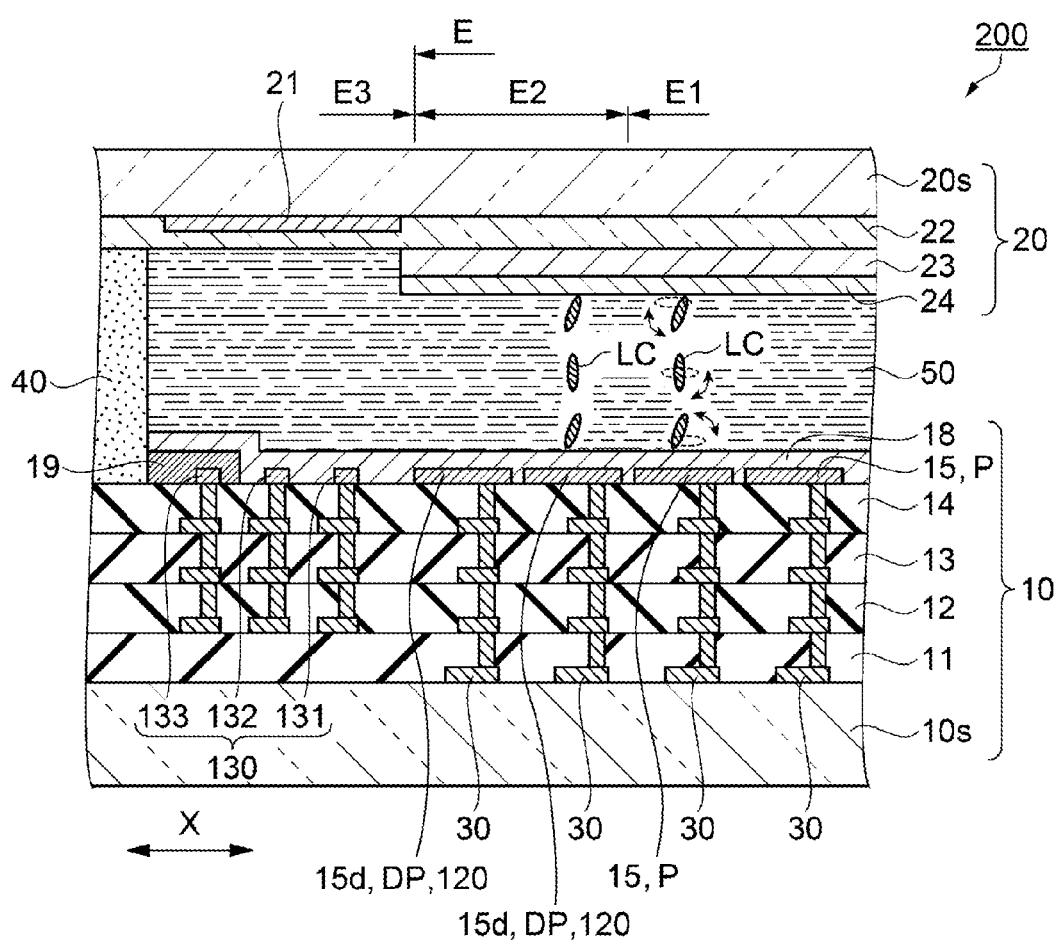
FIG. 16 is a schematic cross-sectional diagram which shows a configuration of a liquid crystal apparatus according to a second embodiment.

Next, description will be given of a liquid crystal apparatus 200 according to a second embodiment with reference to FIG. 16. FIG. 16 is a schematic cross-sectional diagram which shows a structure of the liquid crystal apparatus 200 according to the present embodiment. FIG. 16 is a schematic cross-sectional diagram corresponding to FIG. 13 in the first embodiment. The same reference numerals are applied where the configuration is the same as that of the liquid crystal apparatus 100 of the first embodiment and detailed description thereof will be omitted.

As shown in FIG. 16, the liquid crystal apparatus 200 according to the present embodiment is different from the liquid crystal apparatus 100 of the first embodiment in having an insulating film 19 between the alignment film 18 on the third electrode 133 and the third electrode 133.

The insulating film 19 is formed by a passivation film composed of an oxide such as silicon oxide (SiOx). The insulating film 19 has a film thickness of about 1000 Å to 3000 Å and is formed as a film by, for example, a PVD method such as a vacuum vapor deposition method or a sputtering (direct current sputtering) method, or a chemical vapor deposition method.

Using a passivation film as the insulating film 19 makes it possible to control phenomena such as the reflectivity greatly changing due to variations in film thickness or the reflectivity greatly changing due to the wavelength of the light.

The insulating film 19 is not particularly limited as long as material with a high resistance of two digits or more with respect to the resistance value of the alignment film 18 is used to form the insulating film 19. In addition, the film thickness of the insulating film 19 is not particularly limited as long as the film thickness obtains a sufficiently high resistance value with respect to the alignment film 18.

For example, the reliability of the insulating film 19 may be improved by using a silicon nitride (SiNx) film as the insulating film which is superior to a silicon oxide film from the point of view of water resistance and having a single-layer structure of the silicon nitride film, or by adopting a two-layer structure in which a silicon nitride film is formed on a silicon oxide film.

In addition, it is also possible to use aluminum oxide such as aluminum oxide (AlxOy) (x and y are positive integers) as the insulating film 19.

By the structure as described above, the residual direct current generated in the region in which the third electrode 133 having an insulating film 19 is provided is large in comparison with a case of not having the insulating film 19.

Therefore, it is possible to gather more of the ionic impurities attracted to the third electrode 133 due to the residual direct current in comparison with the liquid crystal apparatus 100 described in the first embodiment.

As a result, since it is possible to suppress the ionic impurities from returning to the display region E when the power of the liquid crystal apparatus 200 is turned off, it is possible to further reduce the influence of burn-in or the like caused by the ionic impurities which are included in the liquid crystal layer 50 on the display.

Third Embodiment

Configuration of Liquid Crystal Apparatus

Figure 17:
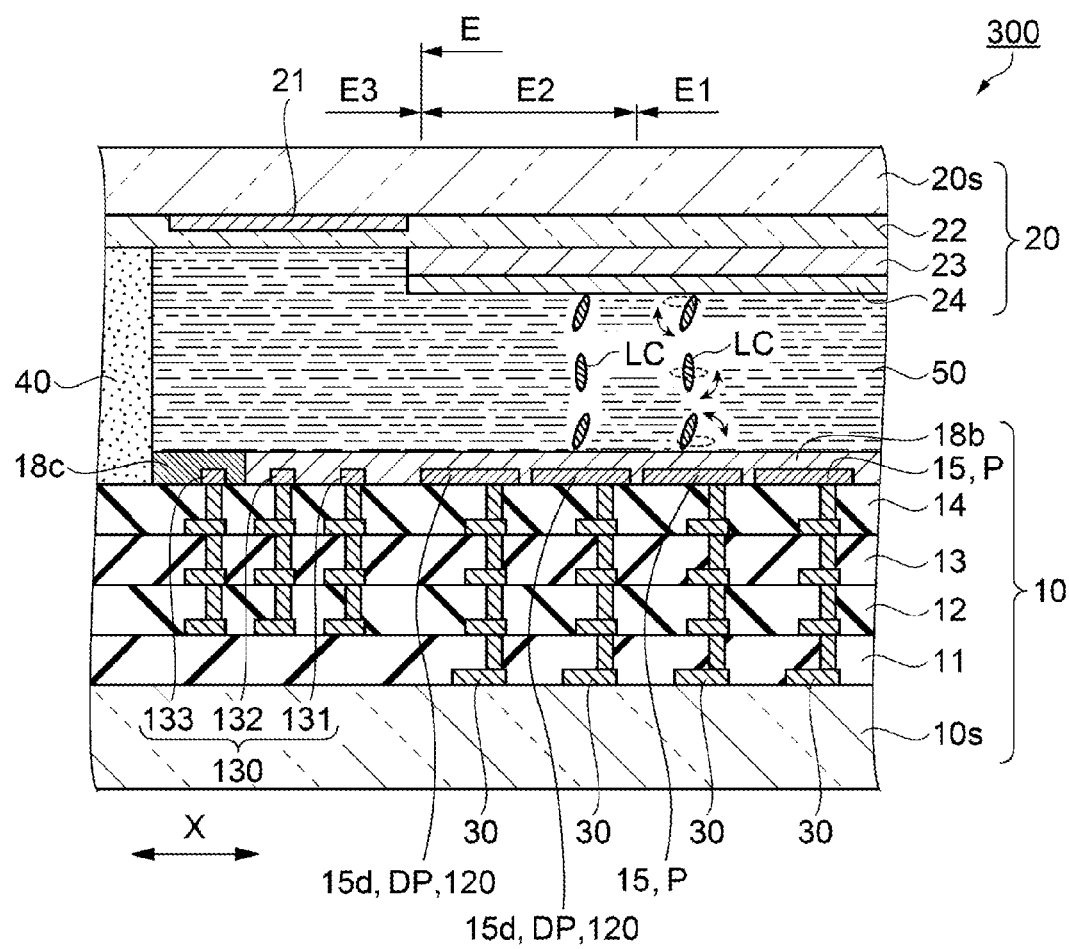
FIG. 17 is a schematic cross-sectional diagram which shows a configuration of a liquid crystal apparatus according to a third embodiment.

Next, description will be given of a liquid crystal apparatus 300 according to the third embodiment with reference to FIG. 17. FIG. 17 is a schematic cross-sectional diagram which shows the structure of the liquid crystal apparatus 300 according to the present embodiment. FIG. 17 is a schematic cross-sectional diagram corresponding to FIG. 13 in the first embodiment. The same reference numerals are applied where the configuration is the same as that of the liquid crystal apparatus 100 of the first embodiment and detailed description thereof will be omitted.

As shown in FIG. 17, the liquid crystal apparatus 300 according to the present embodiment is different from the liquid crystal apparatus 100 described in the first embodiment in that the density of the alignment film 18*c* on the third electrode 133 is lower than the density of the alignment film 18*b* on the first electrode 131 and the second electrode 132.

Specifically, the value of the density of the alignment film 18*b* and the alignment film 18*c* is a range of 1.8 g/cm$^3$ to 2 g/cm$^3$ in a case where the alignment films are inorganic alignment films composed of a silicon oxide film (SiO$_2$ film). It is possible to produce a silicon oxide film with such a density by adjusting the manufacturing conditions of the oblique evaporation method or the like using a mask.

In other words, it is preferable to produce asymmetry between the high-density and low density by the density of the alignment film 18*c* being lower than the density of the alignment film 18*b* on the first electrode 131 and the second electrode 132 in a density range of 1.8 g/cm$^3$ to 2 g/cm$^3$.

In addition, generally, the film density of the alignment films is changed according to the surface roughness of the base film positioned as the lower layer thereof. In other words, since the density of the alignment films formed on the upper layer of the base film is decreased as the roughness of the surface of the base layer is increased, the density of the alignment films may be adjusted by adjusting the surface roughness of the base film of the alignment film.

By the structure as described above, the residual direct current generated on the third electrode 133 is increased in comparison with a case where the density of the alignment film 18*c* on the third electrode 133 is the same as the density of the alignment film 18*b* on the first electrode 131 and the second electrode 132.

Therefore, it is possible for more of the ionic impurities attracted to the third electrode 133 to stay due to the residual direct current in comparison with the liquid crystal apparatus 100 described in the first embodiment.

As a result, since it is possible to suppress the ionic impurities from returning to the display region E when the power of the liquid crystal apparatus 300 is turned off, it is possible to further reduce the influence of burn-in or the like caused by the ionic impurities which are included in the liquid crystal layer 50 on the display.

Fourth Embodiment

Figure 18:
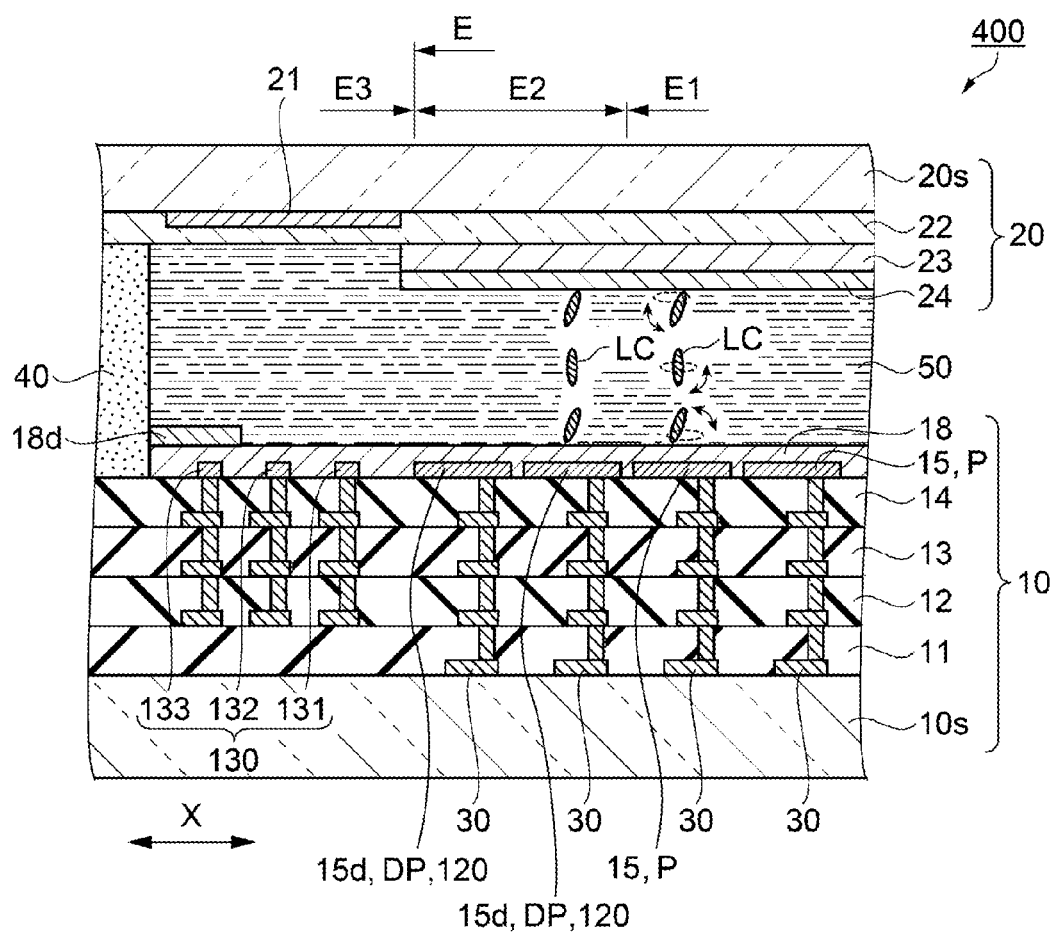
FIG. 18 is a schematic cross-sectional diagram which shows a configuration of a liquid crystal apparatus according to a fourth embodiment.

Next, description will be given of a liquid crystal apparatus 400 according to the fourth embodiment with reference to FIG. 18. FIG. 18 is a schematic cross-sectional diagram which shows the structure of the liquid crystal apparatus 400 according to the present embodiment. FIG. 18 is a schematic cross-sectional diagram corresponding to FIG. 13 in the first embodiment. The same reference numerals are applied where the configuration is the same as that of the liquid crystal apparatus 100 of the first embodiment and detailed description thereof will be omitted.

As shown in FIG. 18, the liquid crystal apparatus 400 according to the present embodiment is different from the liquid crystal apparatus 100 according to the first embodiment in that material 18*d* which captures the ionic impurities is coated on the surface of the alignment film 18 on the third electrode 133.

Specifically, an alkylating process is carried out by coating a silane coupling agent having a silanol group on the surface of the alignment film 18 on the third electrode 133 as the material 18*d* which captures the ionic impurities.

Here, the silane coupling agent has an organic functional group and a hydrolyzable group in one molecule, and, due to this, the inorganic matter and organic matter are linked and it is possible to improve the physical strength, the durability, the adhesion, and the like of the material.

The silane coupling agent has one organic functional group in the silicon atom (Si) and a functional group (hydrolyzable group) which reacts with the inorganic matter, the organic functional group may have good water repellency and light resistance, and specific examples thereof include methyl trimethoxysilane, methyl triethoxysilane, ethyl trimethoxysilane, ethyl triethoxysilane, propyl trimethoxysilane, hexyl trimethoxysilane, octyl trimethoxysilane, decyl trimethoxysilane, dodecyl triethoxysilane, octadecyl trimethoxysilane, and the like.

By the structure as described above, since a large number of silanol groups are present on the outermost surface of the alignment film 18 on the third electrode 133, the residual direct current generated on the third electrode 133 is increased in comparison with a case where a silane coupling agent is not coated on the alignment film 18 on the third electrode 133.

Therefore, it is possible for more of the ionic impurities attracted to the third electrode 133 to stay due to the residual direct current in comparison with the liquid crystal apparatus 100 according to the first embodiment.

As a result, since it is possible to suppress the ionic impurities from returning to the display region E when the power of the liquid crystal apparatus 400 is turned off, it is possible to further reduce the influence of burn-in or the like caused by the ionic impurities which are included in the liquid crystal layer 50 on the display.

Fifth Embodiment

Electronic Equipment

Figure 19:
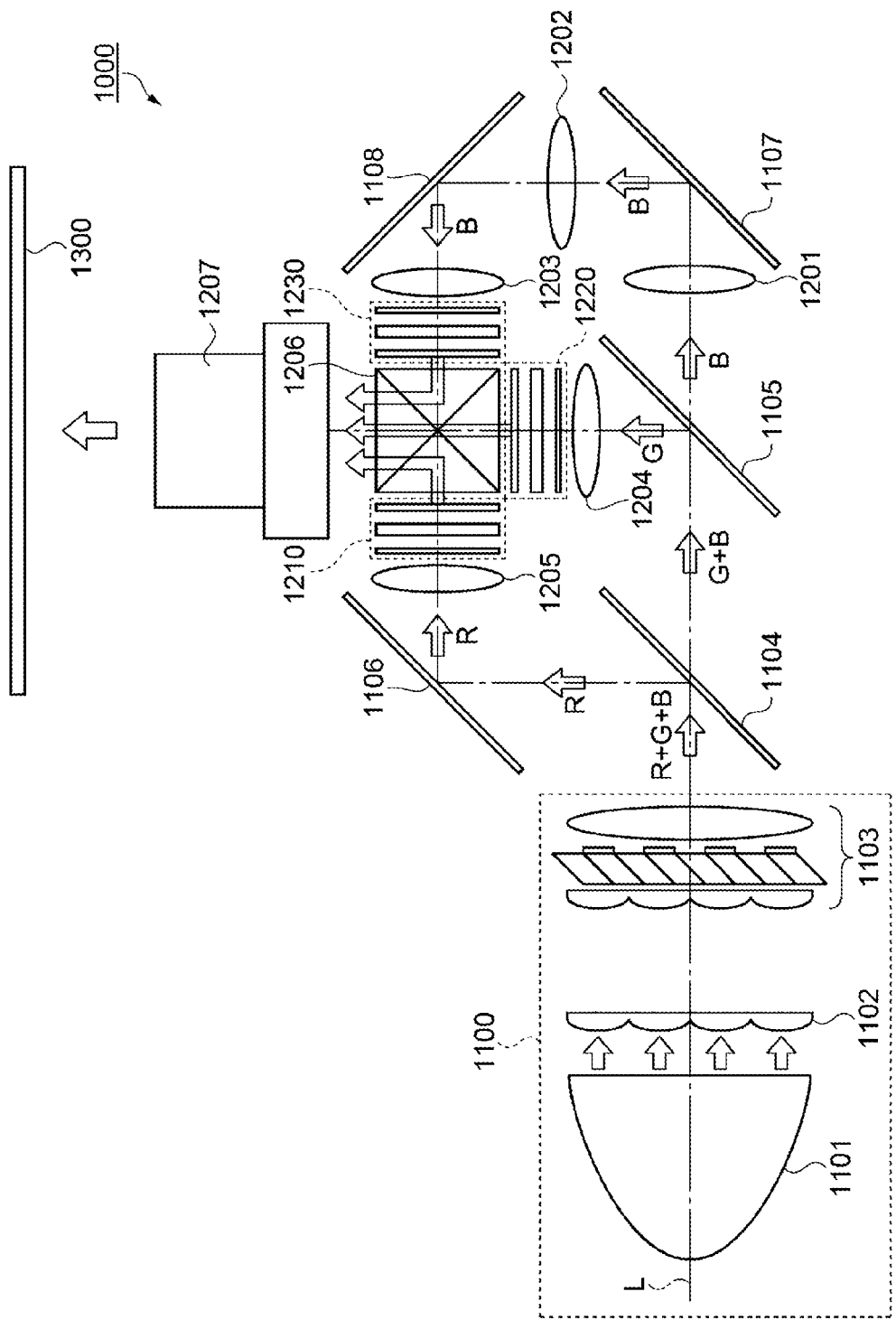
FIG. 19 is a schematic diagram which shows a configuration of a projection-type display apparatus as the electronic equipment according to a fifth embodiment.

Next, description will be given of a projection-type display apparatus as the electronic equipment according to the fifth embodiment with reference to FIG. 19. FIG. 19 is a schematic diagram which shows a configuration of a projection-type display apparatus as the electronic equipment according to the present embodiment.

As shown in FIG. 19, a projection-type display apparatus 1000 as the electronic equipment according to the present embodiment is provided with a polarization illumination apparatus 1100 arranged along a system optical axis L, two dichroic mirrors 1104 and 1105 as light splitting elements, three reflecting mirrors 1106, 1107, and 1108, five relay lenses 1201, 1202, 1203, 1204, and 1205, three transmission-type liquid crystal light valves 1210, 1220, and 1230 as a light modulation means, a cross dichroic prism 1206 as a photosynthesis element, and a projection lens 1207.

The polarization illumination apparatus 1100 is configured to include a lamp unit 1101 as a light source composed of a white light source such as an ultrahigh pressure mercury lamp or a halogen lamp, an integrator lens 1102, and a polarization conversion element 1103.

The dichroic mirror 1104 reflects red light (R) and transmits green light (G) and blue light (B) from within the polarized light beams emitted from the polarization illumination apparatus 1100. Another dichroic mirror 1105 reflects the green light (G) transmitted by the dichroic mirror 1104 and transmits the blue light (B).

The red light (R) reflected by the dichroic mirror 1104 is incident to the liquid crystal light valve 1210 via a relay lens 1205 after being reflected by the reflecting mirror 1106.

The green light (G) reflected by the dichroic mirror 1105 is incident to the liquid crystal light valve 1220 via a relay lens 1204.

The blue light (B) transmitted through the dichroic mirror 1105 is incident to the liquid crystal light valve 1230 via a light guide system composed of three relay lenses 1201, 1202, and 1203 and two reflecting mirrors 1107 and 1108.

The liquid crystal light valves 1210, 1220, and 1230 are each arranged to oppose the incident surface for each color light of the cross dichroic prism 1206. The color light incident to the liquid crystal light valves 1210, 1220, and 1230 is modulated based on image information (image signals) and emitted toward the cross dichroic prism 1206.

In this prism, four rectangular prisms are bonded with each other and, on the inner surfaces thereof, a dielectric multilayer film for reflecting red light and a dielectric multilayer film for reflecting blue light are formed in a cross-shape. Light representing a color image is synthesized by synthesizing three colors of light with these dielectric multilayer films.

The synthesized light is projected on the screen 1300 by a projection lens 1207 which is a projection optical system and the image is enlarged and displayed.

The liquid crystal light valve 1210 is applied to any one of the liquid crystal apparatuses 100, 200, 300, and 400 having the ion trap electrodes 130 described above. A pair of polarizing elements with a crossed Nicols arrangement is arranged with a gap on the color light incident side and the emission side of the liquid crystal panel 110. The other liquid crystal light valves 1220 and 1230 are also similar.

Since the projection-type display apparatus 1000 is provided with a liquid crystal apparatus which includes the ion trap electrodes 130 described from the first embodiment to the fourth embodiment described above as the liquid crystal light valves 1210, 1220, and 1230, the display defects such as burn-in and the like caused by ionic impurities included in the liquid crystal layer 50 are improved and it is possible to project an image with an excellent display quality.

The invention is not limited to the embodiments described above and can be appropriately modified without departing from the gist or spirit of the invention read from claims and the entire specification, and the liquid crystal apparatus changed in this manner and the electronic equipment to which this liquid crystal apparatus is applied are also included in the technical range of the invention. Various modification examples other than the embodiments described above will be considered. Description will be given below of these modification examples.

Modification Example 1

Figure 20:
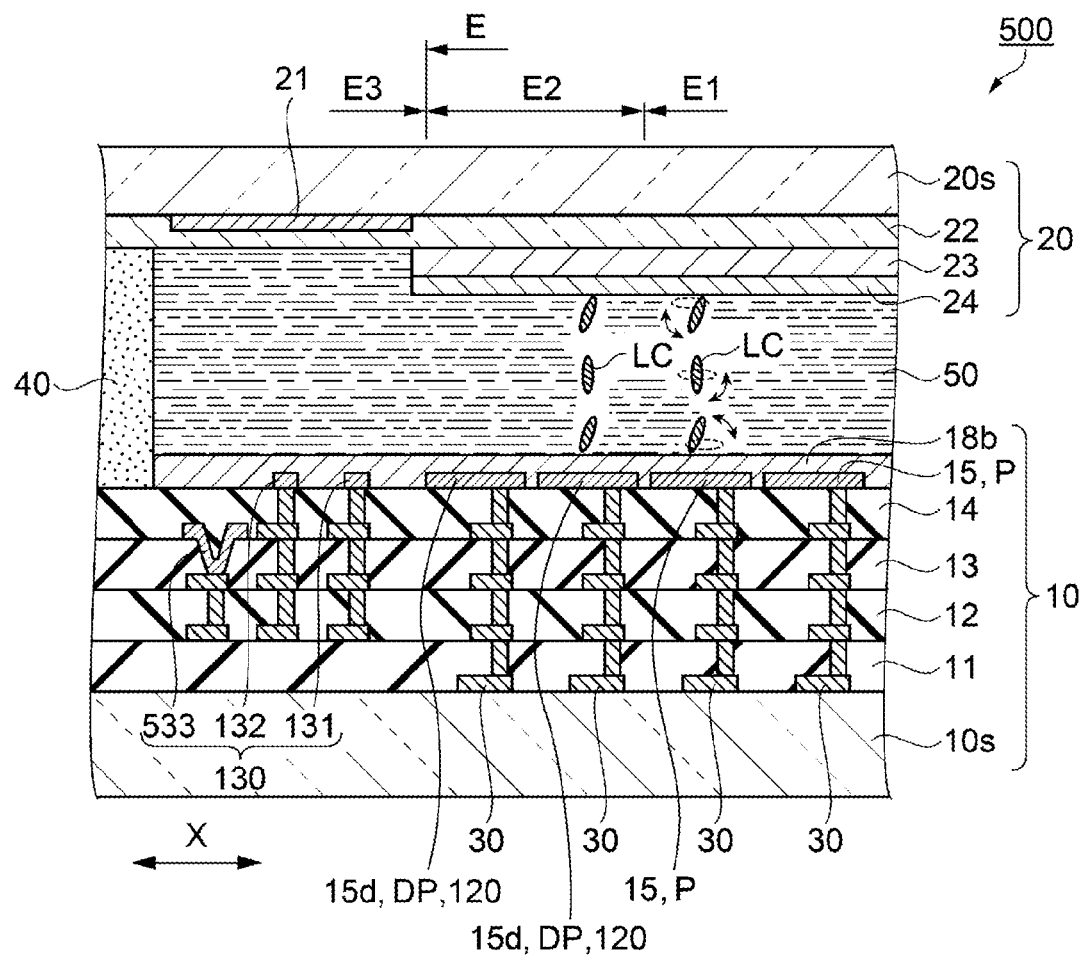
FIG. 20 is a schematic cross-sectional diagram which shows a configuration of a liquid crystal apparatus according to Modification Example 1.

Description will be given of a liquid crystal apparatus 500 according to Modification Example 1 with reference to FIG. 20. FIG. 20 is a schematic cross-sectional diagram which shows the configuration of a liquid crystal apparatus according to the modification example. As shown in FIG. 20, in the liquid crystal apparatus 500, a third electrode 533 may be provided in a different layer to the first electrode 131 and the second electrode 132.

Specifically, the first electrode 131 and the second electrode 132 are provided on the upper surface of the wiring layer 14 and the third electrode 533 is provided on the upper surface of the wiring layer 13.

In a case where the third electrode 533 is formed of, for example, aluminum (Al), on a different layer to the first electrode 131 and the second electrode 132, a contact hole is formed in the wiring layer 13, and afterwards, the third electrode 533 is formed by forming the aluminum (Al) into a film so as to cover the contact hole and carrying out patterning thereon. After forming the wiring layer 14 including the third electrode 533, the first electrode 131 and the second electrode 132 are formed at the same time as the pixel electrodes 15 and the dummy pixel electrodes 15d by forming and patterning an ITO film on the wiring layer 14.

With this forming method, it is possible to electrically insulate the third electrode 533 and the first electrode 131 and the second electrode 132.

Modification Example 2

Figure 21:
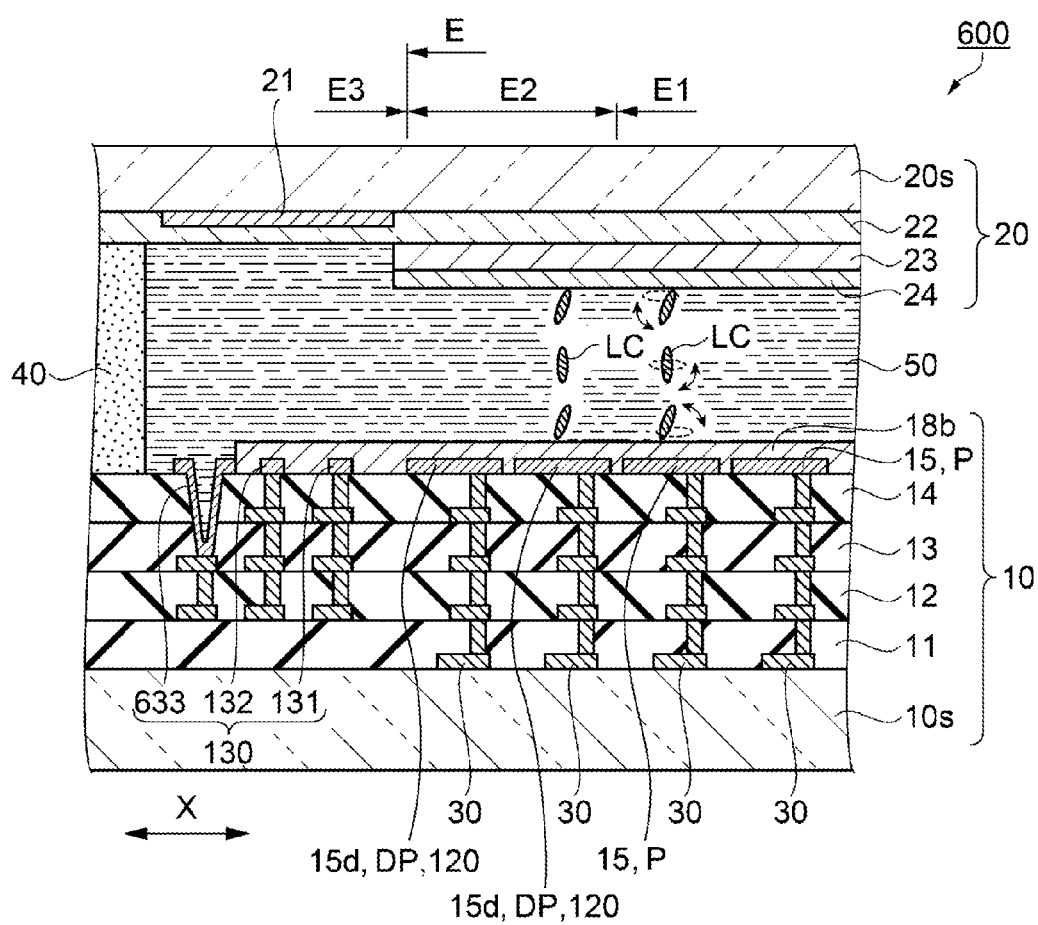
FIG. 21 is a schematic cross-sectional diagram which shows a configuration of a liquid crystal apparatus according to Modification Example 2.

Description will be given of a liquid crystal apparatus 600 according to Modification Example 2 with reference to FIG. 21. FIG. 21 is a schematic cross-sectional diagram which shows the configuration of the liquid crystal apparatus according to the modification example. As shown in FIG. 21, an example is given in which a third electrode 633 is provided in a different layer to the first electrode 131 and the second electrode 132 in the liquid crystal apparatus 600.

Specifically, the first electrode 131 and the second electrode 132 are provided on the upper surface of the wiring layer 14 and the third electrode 633 is provided on the upper surface of the wiring layer 12.

In a case where the third electrode 633 is formed of, for example, aluminum (Al), on a different layer to the first electrode 131 and the second electrode 132, after forming the wiring layer 14, the first electrode 131 and the second electrode 132 are formed at the same time as the pixel electrodes 15 and the dummy pixel electrodes 15d by forming and patterning an ITO film on the wiring layer 14. After forming the wiring layer 14 which includes the pixel electrodes 15, the dummy pixel electrodes 15d, the first electrode 131, and the second electrode 132, a contact hole is formed in the wiring layers 13 and 14 and, after that, the third electrode 633 is formed by forming and patterning a film of aluminum (Al) so as to cover the contact hole.

With such a forming method, in the same manner as Modification Example 1, it is possible to electrically insulate the first electrode 131 and the second electrode 132, and the third electrode 633.

Modification Example 3

Figure 22:
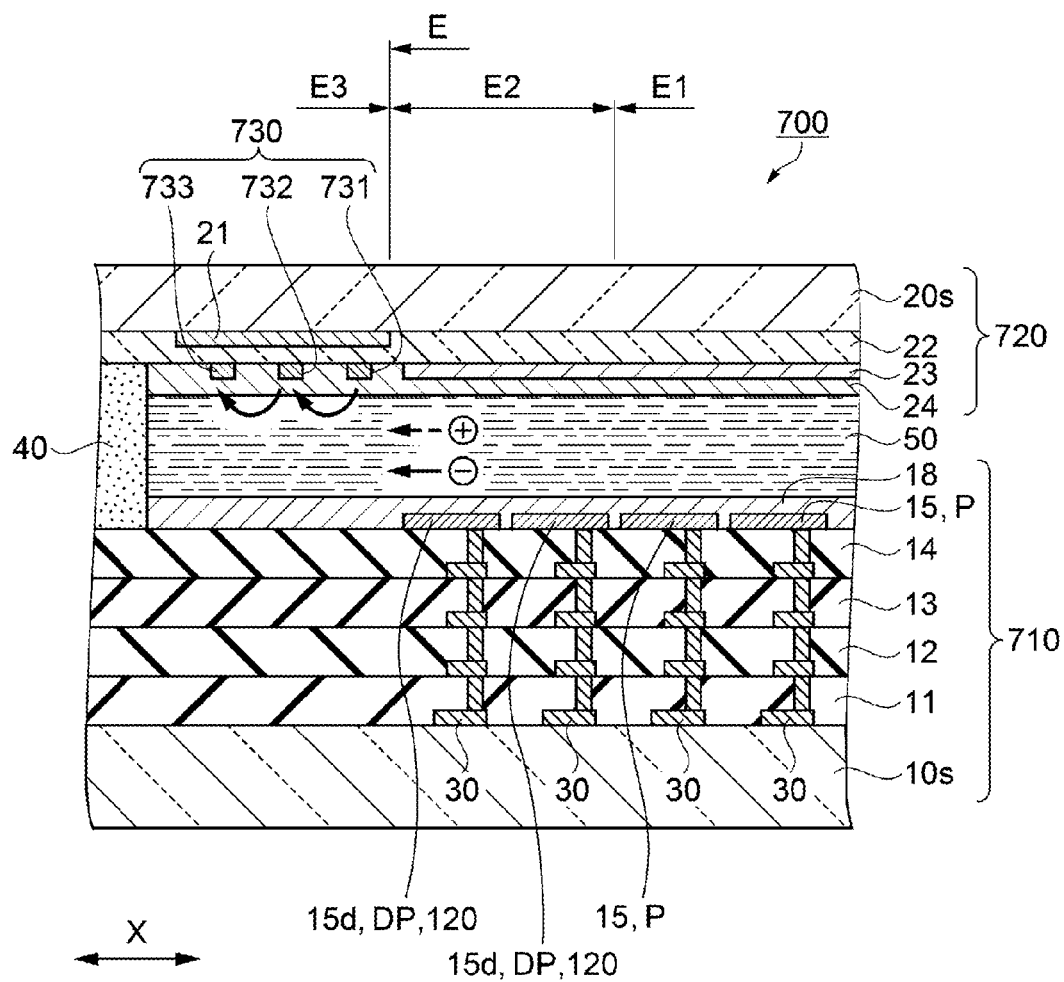
FIG. 22 is a schematic cross-sectional diagram which shows a configuration of a liquid crystal apparatus according to Modification Example 3.

Next, description will be given of a liquid crystal apparatus 700 according to Modification Example 3 with reference to FIG. 22. FIG. 22 is a schematic cross-sectional diagram which shows the configuration of the liquid crystal apparatus according to the modification example. FIG. 22 is the schematic cross-sectional diagram corresponding to FIG. 13 and FIG. 14 in the first embodiment. The same reference numerals are applied where the configuration is the same as that of the liquid crystal apparatus 100 of the first embodiment and detailed description thereof will be omitted.

As shown in FIG. 22, a liquid crystal apparatus 700 according to the modification example is different from the liquid crystal apparatus 100 described in the first embodiment in that a first electrode 731, a second electrode 732, and a third electrode 733 as the ion trap electrodes 730 are arranged in a parting region E3 between the dummy pixel region E2 on the counter substrate 720 side and the sealing material 40 instead of on the element substrate 710 side. In other words, the ion trap electrodes 730 are provided in the parting region E3 in the same layer as the common electrode 23 of the counter substrate 720.

In the ion trap electrodes 730 described in this modification example, in the same manner as the embodiments and the modification examples described above, a potential is applied to each of the ion trap electrodes 730 so that the second reference potential is different from the first reference potential.

The liquid crystal apparatus 700 has the liquid crystal layer 50 interposed in the gap between element substrate 710 and the counter substrate 720 bonded with each other via the sealing material 40, and the pixel electrodes 15 and the dummy pixel electrodes 15d are arranged on the wiring layer 14 of the element substrate 710.

As shown in FIG. 22, the pixel electrodes 15 and the dummy pixel electrodes 15d are covered by the alignment film 18 and the common electrode 23 and the ion trap electrodes 730 are covered by the alignment film 24.

Each of the ion trap electrodes 730 is electrically connected to an external connection terminal 104 (refer to FIG. 8) provided in a terminal section of the element substrate 710 via a vertical conducting section (not shown) provided between the element substrate 710 and the counter substrate 720.

In the same manner as the embodiments described above, alternating current signal with different phases to each other within one period of time, for example, the alternating current signals shown in FIG. 9 or FIG. 10, are applied at the same frequency to each of the ion trap electrodes 730.

When the alternating current signals are applied to each of the ion trap electrodes 730, the electric field shown by the arrow with a solid line is generated between each of the electrodes depending on the polarity.

Since the alternating current signals with different phases are applied to each of the ion trap electrodes 730, the electric fields shown by the arrows with the solid line are gradually scrolled in the direction from the first electrodes 731 close to the display region E toward the third electrode 733.

By the structure as described above, in the liquid crystal apparatus 700 according to the modification example, in the same manner as the ion trap electrodes 130 described in the first embodiment, the ionic impurities in the liquid crystal layer 50 of the display region E are attracted to the ion trap electrodes 730 by the scrolling of the electric field generated between the ion trap electrodes 730 and it is possible for the attracted ionic impurities to stay due to the residual direct current generated on the third electrode 733.

As a result, since it is possible to suppress the ionic impurities from returning to the display region E when the power of the liquid crystal apparatus 700 is turned off, it is possible to reduce the influence of burn-in or the like caused by the ionic impurities which are included in the liquid crystal layer 50 on the display.

Modification Example 4

Without being limited to a VA system, any one of the liquid crystal apparatuses 100, 200, 300, 400, 500, 600, and 700 according to the embodiments described above to which the ion trap electrodes 130 are applicable can also be applied to an in-plane switching (IPS) system, fringe field switching (FFS) system, or optically compensated birefringence (OCB) system.

In addition, the liquid crystal apparatuses according to the embodiments and modification examples described above are not limited to the transmissive projection-type display apparatus 1000 as the electronic equipment described in the fifth embodiment, but can also be applied to a reflection-type display apparatus. In a case where the liquid crystal apparatus according to the embodiments described above is applied to a reflection-type display apparatus, the pixel electrodes 15 may be formed, for example, using Al or an alloy including Al, with a light-reflecting property.

According to such a reflection-type display apparatus, since a reflection-type liquid crystal apparatus is used in a liquid crystal light valve, it is possible to project a bright image and, along with this, and it is possible to provide a reflection-type projection-type display apparatus having excellent display quality in which display defects caused by ionic impurities are improved.

Modification Example 5

In addition, the electronic equipment to which the liquid crystal apparatus described in the embodiments and modification examples described above is applicable is not limited to the projection-type display apparatus 1000 according to the fifth embodiment described above.

For example, the liquid crystal apparatus described in the embodiment described above can be suitably used as the display section of electronic equipment such as a projection-type head-up display (HUD) or a direct-view-type head mounted display (HMD), an E-book, a personal computer, a digital still camera, a liquid crystal television, a view finder-type or monitor direct-view-type video recorder, a car navigation system, an electronic organizer, and a POS.

The entire disclosure of Japanese Patent Application No. 2015-206992, filed Oct. 21, 2015 is expressly incorporated by reference herein.

What is claimed is:

1. A liquid crystal apparatus comprising:
a first substrate and a second substrate which are arranged opposite to each other and bonded with sealing material;
a liquid crystal layer interposed between the first substrate and the second substrate;
a pixel electrode provided in a display region of the first substrate;
a counter electrode provided to oppose the pixel electrode in the first substrate or the second substrate;
a first electrode provided in the first substrate or the second substrate between the display region and the sealing material in plan view and to which a first signal is supplied;
a second electrode provided between the first electrode and the sealing material and to which a second signal is supplied; and
a third electrode provided between the second electrode and the sealing material and to which a third signal is supplied,
wherein the first signal, the second signal, and the third signal are alternating current signals with the same frequency as each other,
the first signal and the second signal transition between positive polarity and negative polarity with respect to a first reference potential,
the third signal transitions between positive polarity and negative polarity with respect to a second reference potential,
the second signal transitions from positive polarity to negative polarity in a period in which the first signal is a negative polarity,
the third signal transitions from positive polarity to negative polarity in a period in which the second signal is a negative polarity, and
the second reference potential is a potential which is different from the first reference potential.

2. The liquid crystal apparatus according to claim 1, wherein the second reference potential is higher than the first reference potential.

3. The liquid crystal apparatus according to claim 1, wherein the second reference potential is lower than the first reference potential.

4. The liquid crystal apparatus according to claim 1, wherein a difference between the second reference potential and the first reference potential is smaller than a value of an amplitude of the first signal and the second signal.

5. The liquid crystal apparatus according to claim 1, wherein a difference between the second reference potential and the first reference potential is 0.3 V or more.

6. The liquid crystal apparatus according to claim 1, wherein the third electrode has a different work function to the first electrode and the second electrode.

7. The liquid crystal apparatus according to claim 1, wherein a density of an alignment film on the third electrode is less than a density of an alignment film on the first electrode and the second electrode.

8. The liquid crystal apparatus according to claim 1, further comprising:
an insulating film between the alignment film on the third electrode and the third electrode.

9. The liquid crystal apparatus according to claim 1, wherein material which captures ionic impurities is coated on a surface of the alignment film on the third electrode.

10. The liquid crystal apparatus according to claim 9, wherein the material which captures the ionic impurities is material which has a silanol group.

11. The liquid crystal apparatus according to claim 1, wherein the first electrode, the second electrode, and the third electrode are provided surrounding the display region.

12. The liquid crystal apparatus according to claim 1, wherein, when a potential difference between the first and the second signal, and the third signal is the maximum, an off sequence which turns off power is performed.

13. Electronic equipment comprising:
the liquid crystal apparatus according to claim 1.

14. Electronic equipment comprising:
the liquid crystal apparatus according to claim 2.

15. Electronic equipment comprising:
the liquid crystal apparatus according to claim 3.

16. Electronic equipment comprising:
the liquid crystal apparatus according to claim 4.

17. Electronic equipment comprising:
the liquid crystal apparatus according to claim 5.

18. Electronic equipment comprising:
the liquid crystal apparatus according to claim 6.

19. Electronic equipment comprising:
the liquid crystal apparatus according to claim 7.

20. Electronic equipment comprising:
the liquid crystal apparatus according to claim 8.

* * * * *